United States Patent
Suenaga et al.

(10) Patent No.: US 11,211,596 B2
(45) Date of Patent: Dec. 28, 2021

(54) METHOD FOR MANUFACTURING ELECTRODE ACTIVE MATERIAL MOLDING FOR LITHIUM-ION BATTERY AND METHOD FOR MANUFACTURING LITHIUM-ION BATTERY

(71) Applicants: SANYO CHEMICAL INDUSTRIES, LTD., Kyoto (JP); NISSAN MOTOR CO., LTD., Kanagawa (JP)

(72) Inventors: Takuya Suenaga, Kyoto (JP); Kenichi Kawakita, Kyoto (JP); Yuki Kusachi, Kanagawa (JP); Yasuhiko Ohsawa, Kanagawa (JP); Hajime Satou, Kanagawa (JP); Hiroshi Akama, Kanagawa (JP); Hideaki Horie, Kanagawa (JP)

(73) Assignees: SANYO CHEMICAL INDUSTRIES, LTD., Kyoto (JP); NISSAN MOTOR CO., LTD., Kanagawa (JP)

( * ) Notice: Subject to any disclaimer, the term of this patent is extended or adjusted under 35 U.S.C. 154(b) by 119 days.

(21) Appl. No.: 16/606,858

(22) PCT Filed: Apr. 20, 2018

(86) PCT No.: PCT/JP2018/016338
§ 371 (c)(1),
(2) Date: Oct. 21, 2019

(87) PCT Pub. No.: WO2018/194163
PCT Pub. Date: Oct. 25, 2018

(65) Prior Publication Data
US 2020/0136125 A1    Apr. 30, 2020

(30) Foreign Application Priority Data
Apr. 21, 2017  (JP) .............................. JP2017-084620

(51) Int. Cl.
*H01M 4/04* (2006.01)
*H01M 4/139* (2010.01)
(Continued)

(52) U.S. Cl.
CPC ......... *H01M 4/0433* (2013.01); *H01M 4/139* (2013.01); *H01M 4/366* (2013.01);
(Continued)

(58) Field of Classification Search
CPC .... H01M 4/0433; H01M 4/139; H01M 4/366; H01M 4/62
(Continued)

(56) References Cited

U.S. PATENT DOCUMENTS

2016/0233510 A1* 8/2016 Onodera ............... H01M 4/661
2017/0018779 A1* 1/2017 Umeyama ........... H01M 4/0433
(Continued)

FOREIGN PATENT DOCUMENTS

EP    3086387    10/2016
JP    2000-164217    6/2000
(Continued)

OTHER PUBLICATIONS

International Search Report dated Jun. 12, 2018 in International (PCT) Application No. PCT/JP2018/016338.
(Continued)

*Primary Examiner* — James M Erwin
(74) *Attorney, Agent, or Firm* — Wenderoth, Lind & Ponack, L.L.P.

(57) ABSTRACT

The present invention provides a method of producing an electrode active material molded body for a lithium-ion battery suitable for the production of a lithium-ion battery, and a method of producing a lithium-ion battery using the electrode active material molded body, wherein the methods can reduce the time, work, equipment, and the like required (Continued)

for the production. The present invention provides a method of producing an electrode composition molded body for a lithium-ion battery, including: a molding step of molding a composition containing an electrode active material for a lithium-ion battery and an electrolyte solution into an electrode active material molded body for a lithium-ion battery as an unbound product of the electrode active material for a lithium-ion battery, wherein the composition has an electrolyte solution content of 0.1 to 40 wt % based on the weight of the composition.

8 Claims, 9 Drawing Sheets

(51) Int. Cl.
    *H01M 4/36*     (2006.01)
    *H01M 4/62*     (2006.01)
    *H01M 10/0525*     (2010.01)
    *H01M 10/058*     (2010.01)

(52) U.S. Cl.
    CPC ........... *H01M 4/62* (2013.01); *H01M 10/058* (2013.01); *H01M 10/0525* (2013.01)

(58) Field of Classification Search
    USPC ........................................................ 29/623.2
    See application file for complete search history.

(56) References Cited

U.S. PATENT DOCUMENTS

| | | | |
|---|---|---|---|
| 2017/0033350 A1 | 2/2017 | Mizuno et al. | |
| 2017/0110728 A1* | 4/2017 | Kobayashi | H01M 4/133 |
| 2020/0028166 A1 | 1/2020 | Tanaka et al. | |
| 2020/0136125 A1 | 4/2020 | Suenaga et al. | |
| 2021/0151739 A1 | 5/2021 | Nishiguchi et al. | |

FOREIGN PATENT DOCUMENTS

| | | |
|---|---|---|
| JP | 2000-294290 | 10/2000 |
| JP | 2002-260739 | 9/2002 |
| JP | 2010-171366 | 8/2010 |
| JP | 2012-156130 | 8/2012 |
| JP | 2012-243710 | 12/2012 |
| JP | 2013-196956 | 9/2013 |
| JP | 2015-099785 | 5/2015 |
| JP | 2015-115103 | 6/2015 |
| JP | 2017-098235 | 6/2017 |
| JP | 2017-147222 | 8/2017 |
| JP | 2018-045902 | 3/2018 |
| JP | 2018-067508 | 4/2018 |
| WO | 2015/093411 | 6/2015 |
| WO | 2018/055956 | 3/2018 |
| WO | 2018/194163 | 10/2018 |
| WO | 2019/230912 | 12/2019 |

OTHER PUBLICATIONS

International Search Report dated Jun. 30, 2020, in International (PCT) Application No. PCT/JP2020/013233, with English translation.
Written Opinion of the International Searching Authority dated Jun. 30, 2020, in International (PCT) Application No. PCT/JP2020/013233, with English translation.
Office Action dated Aug. 11, 2021, in U.S. Appl. No. 17/286,235.

* cited by examiner

Cross-sectional view taken along line A-A

Cross-sectional view taken along line B-B

METHOD FOR MANUFACTURING ELECTRODE ACTIVE MATERIAL MOLDING FOR LITHIUM-ION BATTERY AND METHOD FOR MANUFACTURING LITHIUM-ION BATTERY

TECHNICAL FIELD

The present invention relates to a method of producing an electrode active material molded body for a lithium-ion battery, and a method of producing a lithium-ion battery.

BACKGROUND ART

Lithium-ion (secondary) batteries which are high-capacity, compact, and lightweight secondary batteries are used in various applications these days. As an exemplary method of producing such lithium-ion batteries, a method has been proposed in which a positive electrode active material layer and a negative electrode active material layer are formed on a surface of a sheet-like positive electrode current collector and a surface of a sheet-like negative electrode current collector, respectively, and a peripheral portion of the positive electrode is bonded to a peripheral portion of the negative electrode current collector via an insulation material with a separator layer between the positive electrode active material layer and the negative electrode active material layer (see Patent Literature 1).

CITATION LIST

Patent Literature

Patent Literature 1: JP 2002-260739 A

SUMMARY OF INVENTION

Technical Problem

Yet, the conventional method of producing a lithium-ion battery described above requires a step of forming an active material layer in which an active material is fixed with a binder on the surface of each sheet-like current collector. Such a step includes applying slurry in which the active material and the binder is dispersed in a non-aqueous solvent to the surface of each current collector and drying and firing the slurry. Thus, the step of forming the active material layer is time-consuming, and the non-aqueous solvent in the slurry needs to be collected, making it difficult to simplify the production process and manufacturing equipment.

The present invention was made in view of the above problems, and aims to provide a method of producing an electrode active material molded body for a lithium-ion battery suitable for the production of a lithium-ion battery, and a method of producing a lithium-ion battery using the electrode active material molded body, wherein the methods can reduce the time, work, equipment, and the like required for the production.

Solution to Problem

Specifically, the present invention relates to a method of producing an electrode active material molded body for a lithium-ion battery, including: a molding step of molding a composition containing an electrode active material for a lithium-ion battery and an electrolyte solution into an electrode active material molded body for a lithium-ion battery as an unbound product of the electrode active material for a lithium-ion battery, wherein the composition has an electrolyte solution content of 0.1 to 40 wt % based on the weight of the composition. The present invention also relates to a method of producing a lithium-ion battery, including an assembly step of placing the electrode active material molded body for a lithium-ion battery produced by the above production method in an accommodating portion formed in at least a portion of a battery housing, and integrating the electrode active material molded body with the battery housing to prepare an electrode structure. The present invention still also relates to a method of producing a lithium-ion battery, including: an accommodating step of accommodating the electrode active material molded body for a lithium-ion battery produced by the above production method into a battery housing, wherein in the molding step, a positive electrode active material molded body in which the electrode active material for a lithium-ion battery is a positive electrode active material and a negative electrode active material molded body in which the electrode active material for a lithium-ion battery is a negative electrode active material are prepared, and in the accommodating step, the positive electrode active material molded body and the negative electrode active material molded body are accommodated into the battery housing such that a plurality of battery elements each including the positive electrode active material molded body and the negative electrode active material molded body with a separator therebetween are connected in parallel or series.

Advantageous Effects of Invention

According to the method of producing an electrode active material molded body for a lithium-ion battery of the present invention and the method of producing a lithium-ion battery of the present invention, application of active material slurry to the surface of each current collector is unnecessary, making it possible to reduce the time, work, equipment, and the like required for the production.

DESCRIPTION OF EMBODIMENTS

The present invention is described in detail below.

The method of producing an electrode active material molded body for a lithium-ion battery of the present invention includes a molding step of molding a composition containing an electrode active material for a lithium-ion battery and an electrolyte solution into an electrode active material molded body for a lithium-ion battery as an unbound product of the electrode active material for a lithium-ion battery, wherein the composition has an electrolyte solution content of 0.1 to 40 wt % based on the weight of the composition.

The method of producing an electrode active material molded body for a lithium-ion battery of the present invention includes the molding step of molding a composition containing an electrode active material for a lithium-ion battery (hereinafter also simply referred to as an "active material") and an electrolyte solution into an electrode active material molded body for a lithium-ion battery as an unbound product of the electrode active material for a lithium-ion battery (hereinafter also simply referred to as an "electrode active material molded body").

The electrode active material molded body obtained in the molding step contains the electrode active material for a lithium-ion battery and the electrolyte solution, and satisfies the structural requirements of an electrode for a lithium-ion battery. The electrode active material molded body is a molded body. When two such electrode active material molded bodies each containing a different active material are provided as electrode active materials for a lithium-ion battery, and are arranged with a separator therebetween, the resulting product can be used as a lithium-ion battery. Thus, unlike the conventional method of producing a lithium-ion battery, the production method of the present invention can omit a step of applying active material slurry to current collectors and drying the slurry. Further, since the electrode active material molded body is a molded body, it has good handleability and does not complicate the production process.

Specifically, with the use of the method of producing an electrode active material molded body for a lithium-ion battery of the present invention, a lithium-ion battery can be produced with a simpler procedure than before, and the time, work, equipment, and the like required for the production can be reduced.

In the molding step, the method of molding the composition is not limited. Examples include a method in which the composition which is a mixture of an electrode active material for a lithium-ion battery and an electrolyte solution is injected into a mold having a bottom and a side and compression-molded into any desired shape; a method in which a composition is continuously molded by extrusion; and a method in which a composition is molded by calendering (rolling).

A mold that can be used in the molding step is described.

Figure 1A:
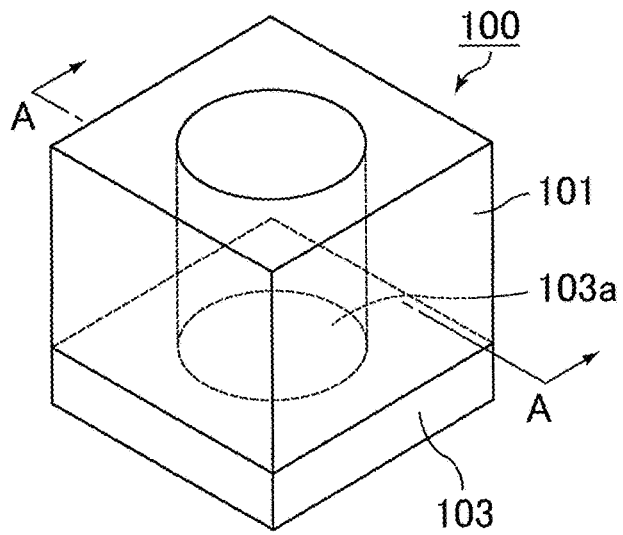
FIG. 1A, FIG. 1B, and FIG. 1C are schematic views showing an exemplary mold for use in a molding step.
Figure 1B:
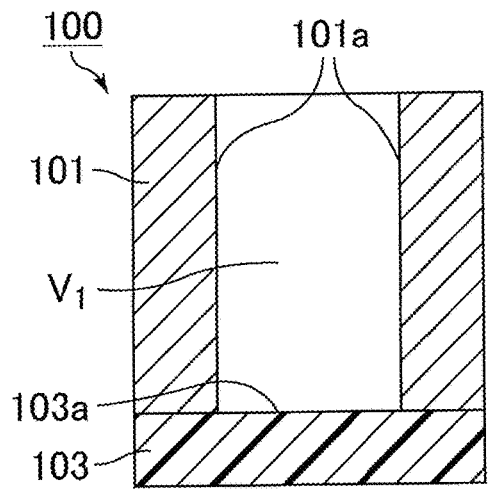
Figure 1C:
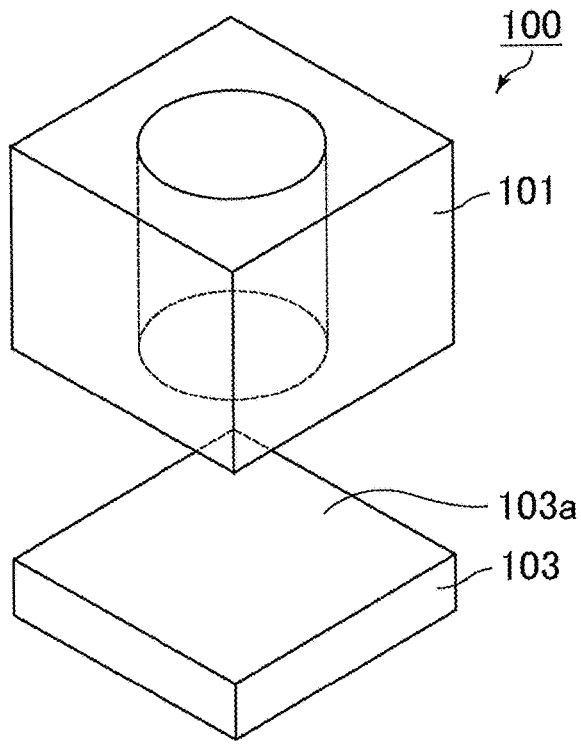

FIG. 1A, FIG. 1B, and FIG. 1C are schematic views showing an exemplary mold for use in a molding step. FIG. 1A is a perspective view schematically showing an exemplary mold for use in the molding step. FIG. 1B is a cross-sectional view taken along line A-A of FIG. 1A. FIG. 1C is a perspective view schematically showing a state in which the mold shown in FIG. 1A is taken apart into constituent parts.

Figure 10:
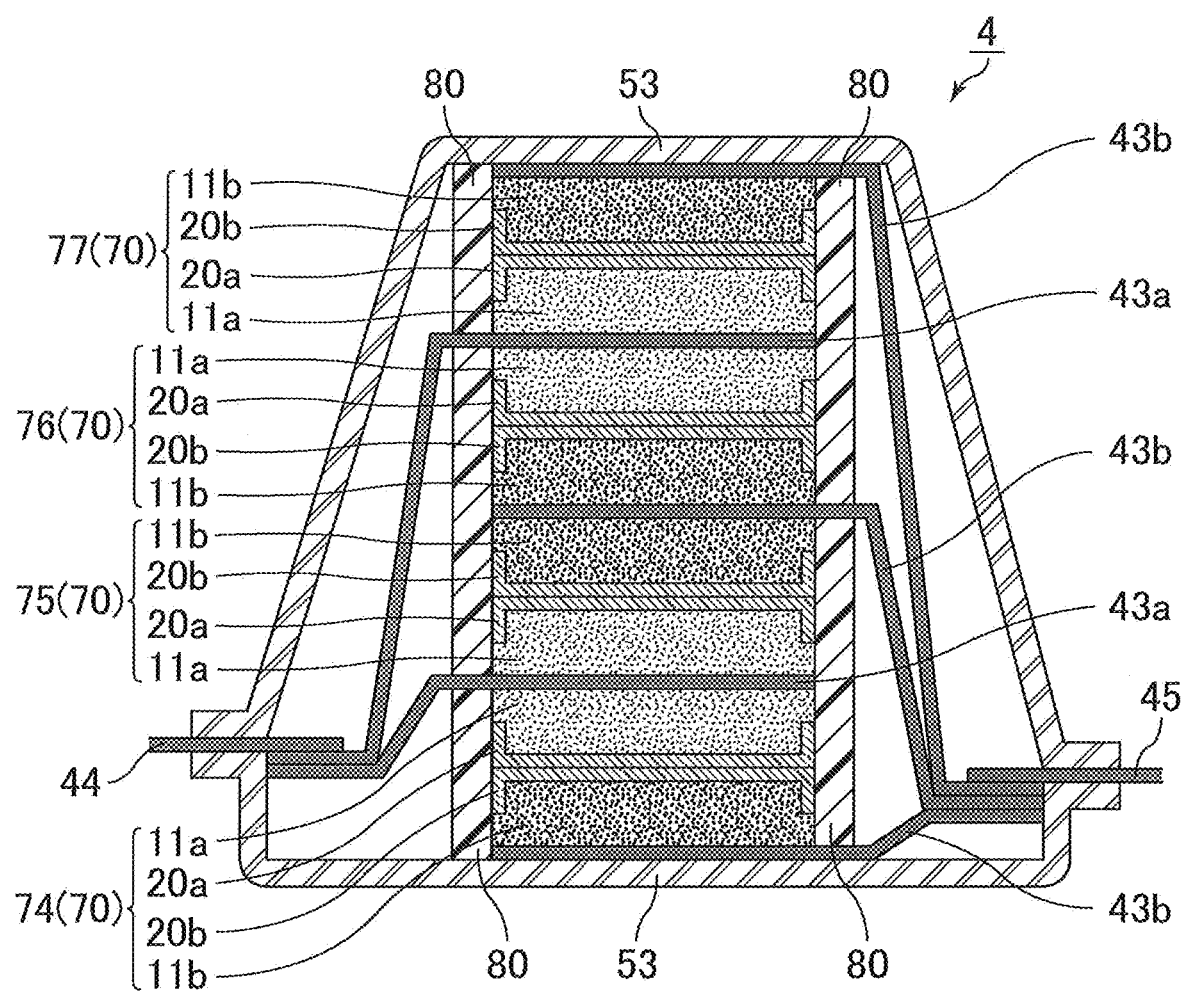
FIG. 10 is a schematic view showing another exemplary lithium-ion battery produced by the method of producing a lithium-ion battery of the present invention.

As shown in FIG. 1A, FIG. 1B, and FIG. 10, a mold 100 includes a side mold 101 and a bottom mold 103. As shown in FIG. 1B, in the mold 100, a cavity $V_1$ is formed which is surrounded by an inner wall 101a of the side mold 101 and an upper bottom 103a of the bottom mold 103. As shown in FIG. 10, preferably, the side mold 101 and the bottom mold 103 are separable from each other.

The following describes the molding step using the mold shown in FIG. 1A, FIG. 1B, and FIG. 10, with reference to FIG. 2A, FIG. 2B, FIG. 2C, FIG. 2D, FIG. 2E, and FIG. 2F as examples.

Figure 2A:
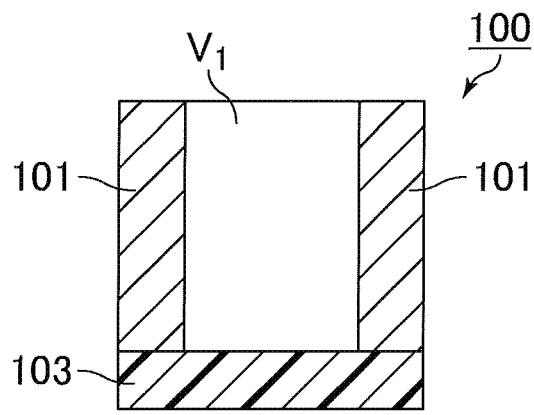
FIG. 2A, FIG. 2B, FIG. 2C, FIG. 2D, FIG. 2E, and FIG. 2F are schematic views showing an exemplary molding step.
Figure 2B:
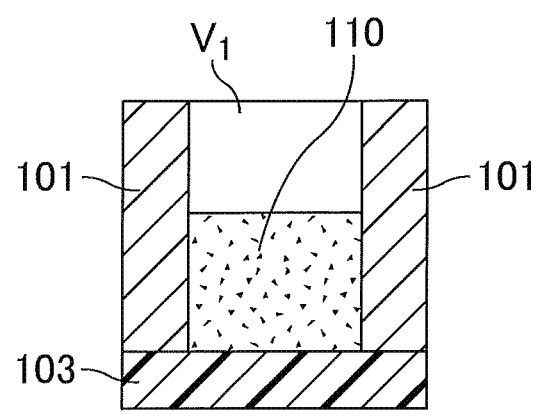
Figure 2C:
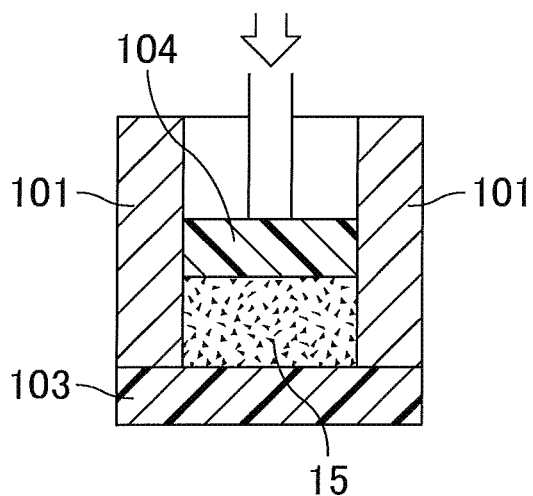
Figure 2D:
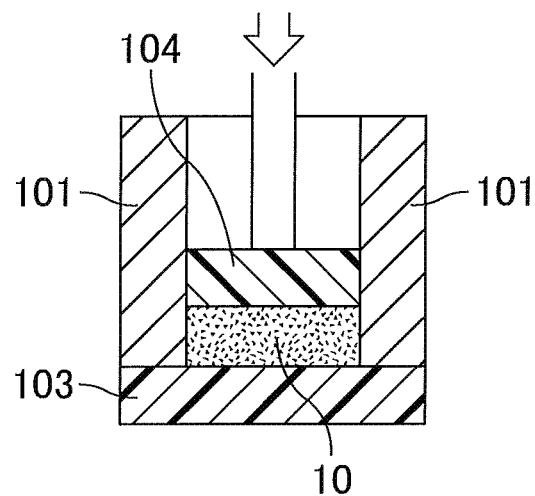
Figure 2E:
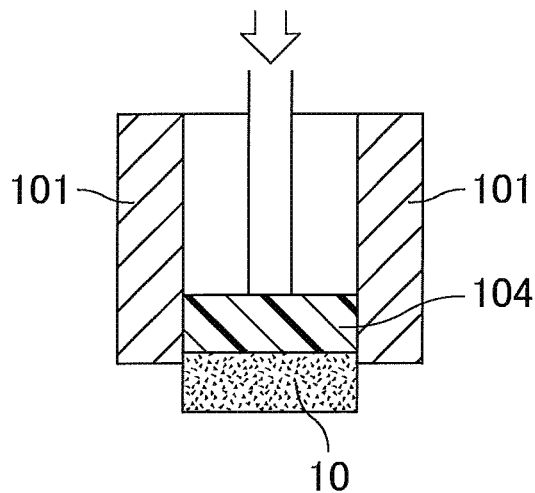
Figure 2F:

FIG. 2A, FIG. 2B, FIG. 2C, FIG. 2D, FIG. 2E, and FIG. 2F are schematic views showing an exemplary molding step. FIG. 2A shows an exemplary mold for use in the molding step. FIG. 2B shows an example in which the composition is injected into the mold in the molding step. FIG. 2C and FIG. 2D each show an example in which the composition is compressed. FIG. 2E shows an example in which the compressed electrode active material molded body is removed from the mold.

As shown in FIG. 2A, the mold 100 includes the cavity $V_1$ with a bottom formed by the bottom mold 103 and a side formed by the side mold 101.

As shown in FIG. 2B, FIG. 2C, and FIG. 2D, a composition 110 is injected into the cavity $V_1$, and compressed by a compression jig 104. The degree of compressing the composition 110 is not limited as long as it is the pressure at which the composition 110 can be molded. The composition may be compressed into an electrode active material molded body 15 (whose density is lower than that of the lithium-ion battery as the final product) shown in FIG. 2C or an electrode active material molded body 10 (which is a lithium-ion battery as the final product) shown in FIG. 2D.

As shown in FIG. 2E, the electrode active material molded body 10 after molding is removed from the mold 100. The electrode active material molded body 15 shown in FIG. 2C may be removed from the mold 100. Through the steps shown in FIG. 2A, FIG. 2B, FIG. 2C, FIG. 2D, and FIG. 2E, the electrode active material molded body 10 shown in FIG. 2F which is a molded body of the electrode active material composition is obtained.

The composition contains the electrode active material for a lithium-ion battery and the electrolyte solution. Thus, as in the case of molding a mixture of sand and water, the composition can be molded into a given shape by a method that uses a mold having a predetermined shape, for example, and the electrode active material molded body thus can be obtained. When the electrode active material for a lithium-ion battery is a coated active material in which at least a portion of its surface is coated with a coating agent containing a coating resin, the coating agent containing the electrolyte solution swells and becomes viscous. Thus, the composition can be molded more easily.

In the method of producing an electrode active material molded body for a lithium-ion battery of the present invention, the term "injected" and its variants mean that the cavity of the mold is filled with the entire composition.

The active material and the electrolyte solution constituting the composition are preferably injected in a uniformly mixed state. Yet, an alternative method may be employed in which only the active material is first placed in the mold and the active material is then immersed in the electrolyte solution, whereby the mold is filled with the composition.

In the method of producing an electrode active material molded body for a lithium-ion battery of the present invention, it is preferred to shake or give a shock to the mold when the composition is injected into the cavity of the mold.

Shaking or giving a shock to the mold when the composition is injected into the cavity of the mold facilitates uniform injection of the composition into the mold.

In the method of producing an electrode active material molded body for a lithium-ion battery of the present invention, the composition has an electrolyte solution content of 0.1 to 40 wt % based on the weight of the composition. The state of the composition before molding (the mixture of the active material and the electrolyte solution) can be a flowable solid-liquid mixture state (also referred to as a "slurry state"), a slightly flowable solid-liquid mixture state (also referred to as a "pendular state" or a "funicular state"), a gel state, wet powder state, or the like.

The slurry state refers to the state of the composition in which all the gaps between at least active materials are filled with the electrolyte solution or in which the volume of the electrolyte solution is larger than the total volume of the gaps. The pendular state or the funicular state refer to the state in which the gaps between the active materials are partially filled with the electrolyte solution. The funicular state refers to the state obtained by mixing the active materials with the electrolyte solution having a volume less than the total volume of the gaps between the active materials. When a small amount of liquid is added to a group of close-packed particles, the liquid drops are annually attached around a particle with the contact point with the particle as the center and are present discontinuity (pendular state). As the amount of the liquid increases, the annually attached liquid drops become larger. Eventually, these liquid drops are connected annually, resulting in a state in which the liquid phase has a continuous structure while gaps are present (funicular state). As the amount of the liquid further increases, the gaps will disappear, resulting in a state in which only the two phases (solid and liquid phases) are present in a continuous structure, thus changing to the slurry state.

Among these, the pendular state, the funicular state, the gel state, and the wet powder state are preferred. When the electrode active material has one of the above states, the composition can be molded more easily.

In the method of producing an electrode active material molded body for a lithium-ion battery of the present invention, in the molding step, preferably, a separator is placed in the mold having a bottom and a side so as to cover the entire bottom of the mold and at least a portion of the side of the mold, the composition is injected into the mold with the separator placed therein and molded, and the entire surface of the composition corresponding to the bottom of the mold and at least a portion of the surface of the composition corresponding to the side of the mold are continuously covered with the separator.

The above method can produce an electrode active material molded body unit in which the electrode active material molded body is integrated with the separator in the molding step.

An exemplary mold that can be used to produce the electrode active material molded body unit is described with reference to FIG. 3A, FIG. 3B, and FIG. 3C.

Figure 3A:
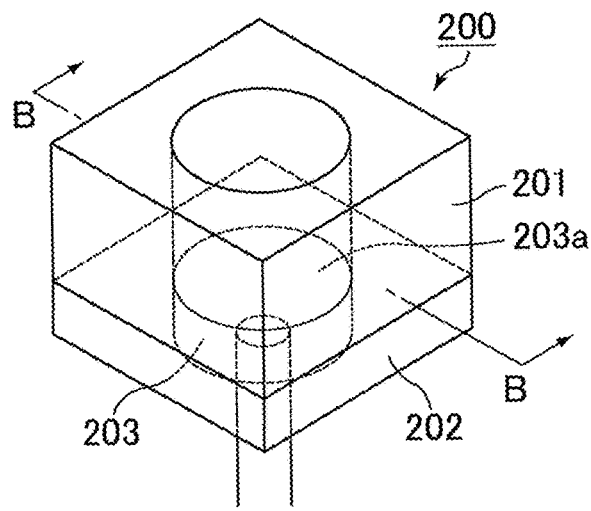
FIG. 3A, FIG. 3B, and FIG. 3C are schematic views showing another exemplary mold for use in the molding step.
Figure 3B:
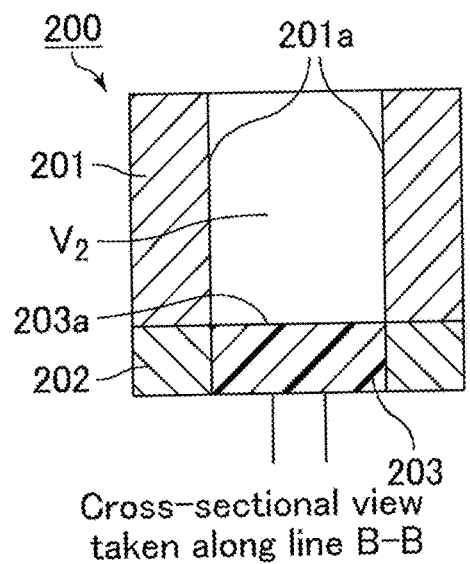
Figure 3C:
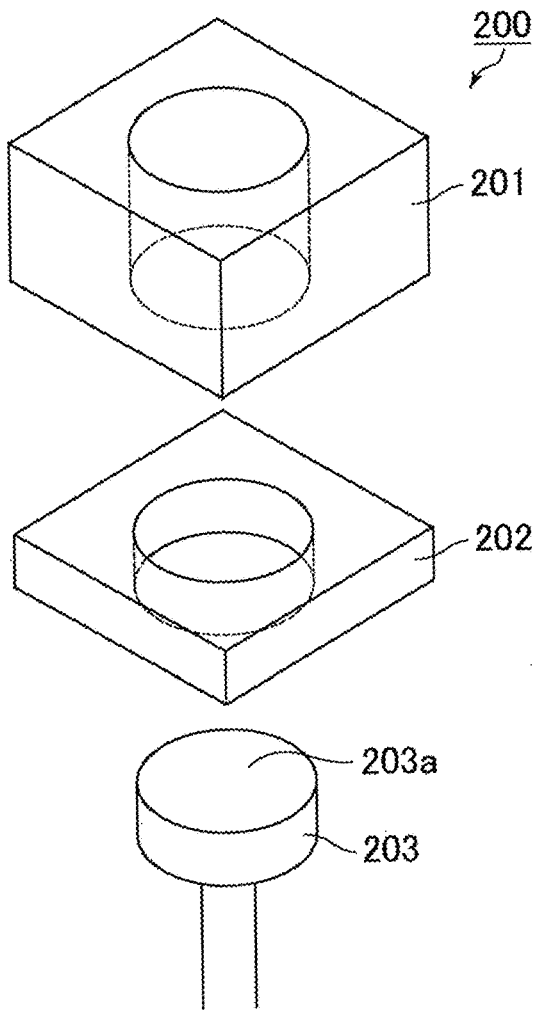

FIG. 3A, FIG. 3B, and FIG. 3C are schematic views showing another exemplary mold for use in the molding step. FIG. 3A is a perspective view schematically showing an exemplary mold for use in the molding step. FIG. 3B is a cross-sectional view taken along line B-B of FIG. 3A. FIG. 3C is a perspective view schematically showing a state in which the mold shown in FIG. 3A is taken apart into constituent parts.

As shown in FIG. 3A and FIG. 3B, a mold 200 includes a side mold 201, a bottom mold 203, and a corner mold 202. In the mold 200, a cavity $V_2$ is formed which is surrounded by an inner wall 201a of the side mold 201 and an upper bottom 203a of the bottom mold 203.

As shown in FIG. 3C, the side mold 201, the bottom mold 203, and the corner mold 202 may be separable from each other.

While the corner mold 202 functions to fix the bottom mold 203 to a predetermined position in the state shown in FIG. 3A and FIG. 3B, the corner mold 202 functions as a side mold when the bottom mold 203 is moved downwards in a step described later.

The following describes a method of producing the electrode active material molded body unit in which the electrode active material molded body is integrated with the separator using the mold, with reference to FIG. 4A, FIG. 4B, FIG. 4C, FIG. 4D, FIG. 4E, FIG. 4F, and FIG. 4G.

FIG. 4A, FIG. 4B, FIG. 4C, FIG. 4D, FIG. 4E, FIG. 4F, and FIG. 4G are illustrations schematically showing an exemplary molding step in which the mold shown in FIG. 3A, FIG. 3B, and FIG. 3C is used.

Figure 4A:
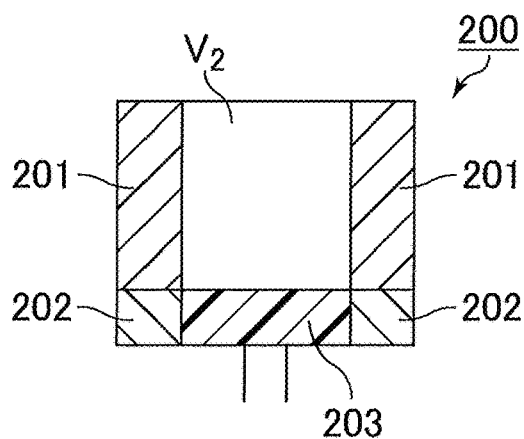
FIG. 4A, FIG. 4B, FIG. 4C, FIG. 4D, FIG. 4E, FIG. 4F, and FIG. 4G are schematic views showing another exemplary molding step.
Figure 4B:
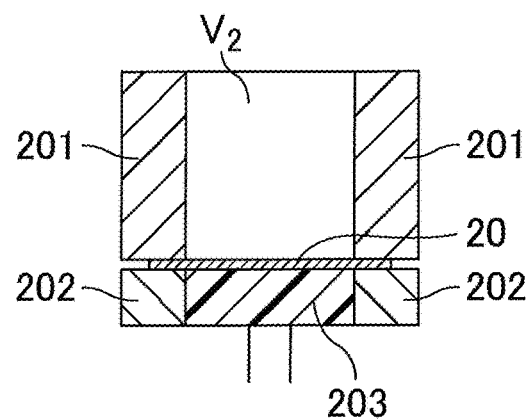
Figure 4C:
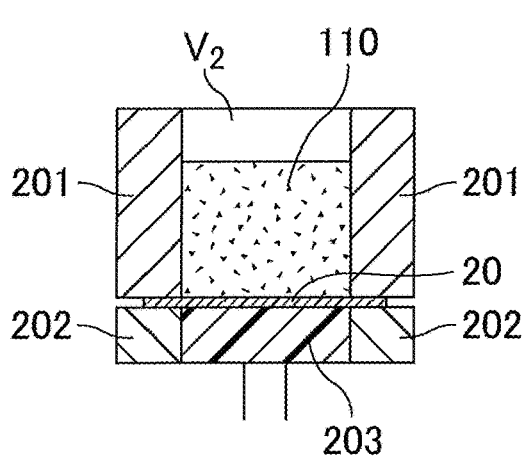
Figure 4D:
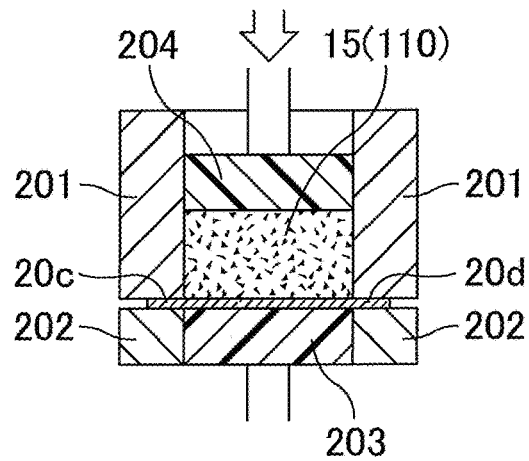
Figure 4E:
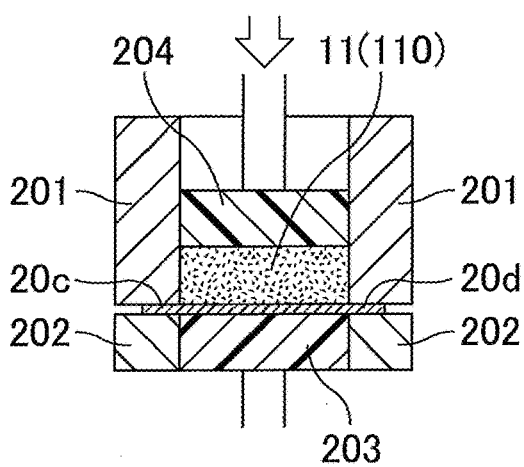
Figure 4F:
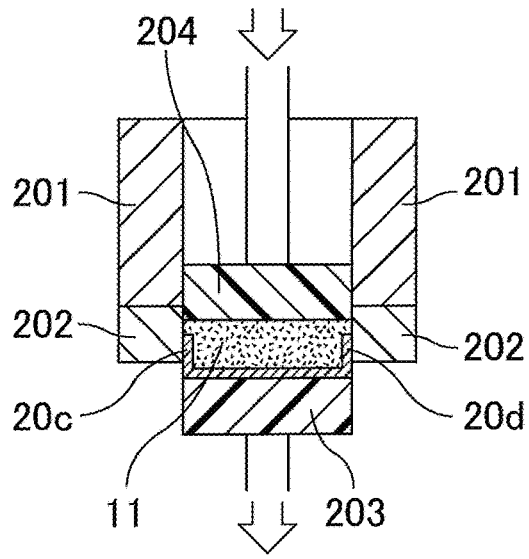
Figure 4G:
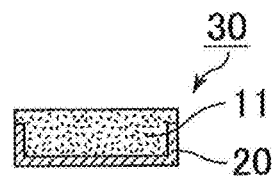

FIG. 4A, FIG. 4B, FIG. 4C, FIG. 4D, FIG. 4E, FIG. 4F, and FIG. 4G are schematic views showing another exemplary molding step. FIG. 4A shows an exemplary mold for use in the molding step. FIG. 4B shows an example in which the separator is placed in the mold in the molding step. FIG. 4C shows an example in which the composition is injected into the mold. FIG. 4D, FIG. 4E, and FIG. 4F show an example in which the composition is compressed. FIG. 4G shows an exemplary electrode active material molded body unit obtained by the steps shown in FIG. 4A, FIG. 4B, FIG. 4C, FIG. 4D, FIG. 4E, and FIG. 4F.

As shown in FIG. 4A, the mold 200 includes the cavity $V_2$ with a bottom formed by the bottom mold 203 and a side formed by the side mold 201.

The following describes an exemplary method of placing the separator in the mold, with reference to FIG. 4B.

When placing the separator, for example, a separator 20 is placed on the bottom mold 203 and the corner mold 202 as shown in FIG. 4B.

The separator 20 is placed on the bottom mold 203 and between the side mold 201 and the corner mold 202. The separator 20 covers the entire upper bottom of the bottom mold 203, and has an area larger than that of the top surface of the bottom mold 203.

In FIG. 4B, the separator 20 is placed between the side mold 201 and the corner mold 202. Yet, the side mold 201 and the corner mold 202 do not have to be separable (i.e., the mold 100 shown in FIG. 1A, FIG. 1B, and FIG. 1C is used), and the separator 20 may be placed in the mold in such a manner that the separator 20 is bent in a U-shape. When the separator 20 is placed in a U-shape in the mold, in order to improve the contact between the separator 20 and the mold 200, the separator may be tightly attached to the bottom of the mold 200 by pushing the separator 20 against the upper bottom of the bottom mold 203 using a jig or the like having a shape corresponding to the shape of the cavity.

The following describes an exemplary method of injecting the composition into the mold with the separator placed therein, with reference to FIG. 4C.

In an exemplary method of injecting the composition into the mold with the separator placed therein, the composition 110 containing an active material and an electrolyte solution is injected into the cavity $V_2$ in the mold 200 as shown in FIG. 4C. The separator 20 is placed on the bottom of the mold 200, so that the composition 110 injected into the mold 200 is placed on the separator 20.

The following describes a method of molding the composition injected into the mold, with reference to FIG. 4D, FIG. 4E, and FIG. 4F.

In an exemplary method of molding the composition injected into the mold, the composition 110 injected into the mold 200 is compressed using a compression jig 204 from a side opposite to the bottom mold 203, as shown in FIG. 4D and FIG. 4E.

The compression jig 204 preferably has a shape substantially corresponding to the shape of the cavity $V_2$ formed in the mold 200. The composition 110 injected into the cavity $V_2$ is compressed using the compression jig 204, whereby the composition 110 is molded into the electrode active material molded body 15 shown in FIG. 4D. Further compression of the composition 110 results in an electrode active material molded body 11 shown in FIG. 4E.

Subsequently, as shown FIG. 4F, the bottom mold 203 is moved to the same direction as the compression direction of the compression jig 204, whereby ends 20c and 20d of the separator held between the side mold 201 and the corner mold 202 can be pulled out to the side of the corner mold 202 and placed on the side of the electrode active material molded body 11.

Through the steps shown in FIG. 4E and FIG. 4F, the electrode active material molded body 11 can be integrated with the separator 20, and an electrode active material molded body unit 30 shown in FIG. 4G can be obtained in which the entire surface of the electrode active material molded body 11 corresponding to the bottom of the mold 200 and at least a portion of the surface of the electrode active material molded body 11 corresponding to the side of the mold 200 are continuously covered with the separator 20.

As shown in FIG. 4F, the resulting electrode active material molded body unit 30 is preferably taken out from the bottom mold 203 side. When an attempt is made to taken out the electrode active material molded body unit 30 from the opposite side (the side where the compression jig 204 is present), the separator 20 placed on the side of the mold side may be separated or broken.

When the separator 20 is placed in a U-shape in the mold 200, the step shown in FIG. 4F is unnecessary.

The degree of compressing the composition 110 is not limited as long as it is the pressure at which the composition 110 can be molded. The composition may be compressed into the electrode active material molded body 15 (whose density is lower than that of the lithium-ion battery as the final product) shown in FIG. 4D or the electrode active material molded body 11 (which is a lithium-ion battery as the final product) shown in FIG. 4E. Specifically, the molding step may involve moving the bottom mold 203 to the same direction as the compression direction of the compression jig 204 from the state shown in FIG. 4D so that the ends 20c and 20d of the separator held between the side mold 201 and the corner mold 202 are pulled out to the side of the corner mold 202 and placed on the side of the electrode active material molded body 15, whereby the electrode active material molded body 15 is integrated with the separator 20 into an electrode.

The mold may have any shape as long as it has a bottom and a side.

The bottom mold may be integrated with the side mold. Yet, preferably, the side mold and the bottom mold are separable from each other as shown in FIG. 1A, FIG. 1B, and FIG. 1C, and more preferably, the side mold can be divided into two parts at the height of the bottom as shown in FIG. 3A, FIG. 3B, and FIG. 3C.

Of the mold parts constituting the side mold, the mold part constituting the portion lower the height of the bottom does not substantially constitute the side, and is thus also referred to as a "corner mold".

Examples of the material constituting the mold include materials such as metals generally used in the molds.

The surface of the mold may be coated with fluorine or the like in order to reduce friction generated between the mold and the electrode active material molded body.

The shape of the cavity formed in the mold (hereinafter simply referred to as the "cavity") may be adjusted according to the shape of the intended electrode active material molded body, and the shape is preferably constant in the compression direction. For example, a cylindrical shape or a prism shape is preferred.

Use of a mold in which the cavity has a cylindrical shape results in an electrode active material molded body having a substantially circular shape in a plan view. Use of a mold in which the cavity has a prism shape results in an electrode active material molded body having a substantially rectangular shape in a plan view.

In the molding step, the separator may be placed to cover the entire bottom and at least a portion of the side of the mold. Placing the separator to cover the entire bottom and at least a portion of the side of the mold makes it possible to obtain an electrode active material molded body unit in which the separator is integrated with the electrode active material molded body. Such an electrode active material molded body unit is preferred because there is no need to separately provide a separator when producing a lithium-ion battery by assembling the electrode active material molded body units together, improving handleability of the electrode active material molded body. In addition, the electrode active material molded body unit in which the entire surface corresponding to the bottom of the mold and at least a portion of the surface corresponding to the side of the mold are covered with the separator is preferred because when the electrode active material molded body unit is integrated with a battery housing in the assembly step, the exposed area of the electrode active material molded body is small, and the quality of the lithium-ion batteries produced tends to be consistent.

The separator for use preferably has a shape that can completely cover the bottom of the mold and at least a portion of the side of the mold. The separator does not have to be tightly attached to the bottom of the mold, but it is more preferred that the separator is tightly attached thereto.

In an exemplary method of tightly attaching the separator to the bottom of the mold, the separator placed on the bottom of the mold is pressed against the bottom of the mold using a jig or the like.

When placing the separator in the mold, a folding line corresponding to the size of the electrode active material molded body after molding may be formed in the separator in advance, or a separator molded into a predetermined a three-dimensional shape may be placed in the mold in advance, in order to tightly attach the separator to the bottom and the side of the mold.

The separator to be placed in the mold does not have to have a three-dimensional shape that is tightly attached to the bottom and the side of the mold. In such a case, the separator may be formed into a three-dimensional shape that is tightly attached to the bottom and the side of the mold, when the composition is injected into or compressed in the mold with the separator placed therein.

Preferably, the area of the separator is large enough to cover the entire surface of the electrode active material molded body corresponding to the bottom of the mold (i.e., the bottom of the electrode active material molded body) and at least a portion of the surface of the electrode active material molded body corresponding to the side of the mold (i.e., the side of the electrode active material molded body). More preferably, the area of the separator is large enough to cover the entire surface corresponding to the bottom of the mold and the entire surface corresponding to the side of the mold. Still more preferably, the area of the separator is large enough to cover not only the entire surface corresponding to the bottom of the mold and the entire surface corresponding to the side of the mold but also the surface corresponding to the surface opposite to the bottom of the mold (i.e., the top of the electrode active material molded body). Yet, when the separator is placed to cover the entire top of the electrode active material molded body with a current collector stacked thereon, the current collector needs to be placed in such a manner that a portion of the current collector placed inside the separator (the electrode active material molded body side) is exposed to the outside. In an exemplary method of exposing a portion of the current collector placed inside the separator to the outside, the current collector is folded in between overlapping separators, or a slit is formed in the separator and the current collector is led out through the slit.

When the separator is placed to cover the entire bottom of the electrode active material molded body, direct contact between the positive electrode active material molded body and the negative electrode active material composition can be prevented. Preferably, the separator is placed to further cover the entire bottom and at least a portion of the side of the electrode active material molded body (more preferably, the entire bottom, the entire side, and the entire top of the electrode active material molded body). It is preferred because in this case, the exposed area of each electrode active material molded body is small when the electrode active material molded body is integrated with the battery housing, so that direct contact between the positive electrode members (the positive electrode current collector and the positive electrode active material molded body) and the negative electrode members (the negative electrode current collector and the negative electrode active material molded body) in the battery is prevented, and thus, the quality of the lithium-ion batteries produced tends to be consistent.

In the method of producing an electrode active material molded body for a lithium-ion battery of the present invention, when the molding step is performed without placing a separator, the method may include an additional step of covering the surface of the electrode active material molded body with a separator after the molding step.

Here, preferred regions of the surface of the electrode active material molded body to be covered with the separator, the area of the separator, and the arrangement of the current collector are the same as those in the case where the electrode active material molded body is covered with the separator in the molding step.

Examples of materials constituting the separator include microporous films made of polyethylene or polypropylene; multilayer films consisting of a porous polyethylene film and a porous polypropylene; non-woven fabric made of polyester fibers, aramid fibers, or glass fibers; and such non-woven fabric with ceramic fine particles such as silica, alumina, or titania particles attached to the surface thereof.

The electrode active material molded body is preferably such that 5 to 100% of the side is covered with the separator.

The pressing strength of the compression jig against the composition is not limited, but it is preferably 10 to 2000 MPa, more preferably 50 to 1000 MPa.

Here, the proportion of the injected molded composition is preferably 40 to 70% when the active material is a positive electrode active material (i.e., the positive electrode active material molded body), and is preferably 50 to 80% when the active material is a negative electrode active material (i.e., the negative electrode active material molded body). The above proportion is represented by the ratio (volume percentage) of the volume of solids contained in the electrode active material molded body to the volume of the electrode active material molded body.

The following describes extrusion which is one of methods of obtaining the electrode active material molded body.

In an exemplary method of obtaining an electrode active material molded body by extrusion, a conventionally known extruder is used.

The extruder may be one including a feeding tube through which a raw material is fed, a die (also referred to as a "mold") attached to the raw material discharge side of the feeding tube, and a rotating shaft screw that extrudes the raw material placed in the feeding tube into the die.

An active material and an electrolyte solution, which are raw materials of the electrode active material molded body, are fed into the feeding tube, and the active material and the electrolyte solution that were moved through the feeding tube by the rotation of the screw are extruded from the die, whereby an electrode active material molded body can be obtained. The shape of the electrode active material molded body can be suitably adjusted by adjusting the shape of the die and the rotation speed of the screw.

The shape of the composition discharged from the die is not limited, but it is preferably a cylindrical shape or a quadrangular prism shape. The composition discharged from the die is cut into a predetermined length, whereby an electrode active material molded body for a lithium-ion battery is obtained.

The method of cutting the composition discharged from the die is not limited. Examples include a method that uses a rotary cutter or a thread.

The temperature of the composition during extrusion is not limited, but it is preferably 40° C. or lower in view of moldability or the like.

A preferred mixing ratio of the active material and the electrolyte solution and preferred properties of the composition before molding are the same as those in the case of compression molding using a mold.

The electrode active material molded body obtained by extrusion may be accommodated into an accommodating portion of a battery housing in the same manner as in the case of an electrode active material molded body obtained by a method of molding an electrode active material molded body without placing a separator in a mold.

In an exemplary method of obtaining an electrode active material molded body by calendering, a known roll pressing machine is used.

A mixture of an active material and an electrolyte solution is fed from a continuous mixer such as a kneader; the mixture is spread to a certain thickness on a smooth surface such as a film by a doctor blade or the like; and the mixture is roll-pressed, whereby a sheet of an electrode active material molded body can be obtained. The sheet of the electrode active material molded body is cut into a predetermined length, and the molding step is thus completed.

A preferred mixing ratio of the active material and the electrolyte solution and preferred properties of the composition before molding are the same as those in the case of compression molding using a mold.

The electrode active material molded body for a lithium-ion battery obtained by the method of producing an electrode active material molded body for a lithium-ion battery of the present invention contains an electrolyte solution. When the amount of the electrolyte solution is optimal for the molding step, the battery performance of the resulting lithium-ion battery may be insufficient. Thus, after the electrode active material molded body obtained in the molding step is accommodated into the accommodating portion of the battery housing, the electrolyte solution may be additionally added to the electrode active material molded body.

The following describes the composition.

The composition contains the active material and the electrolyte solution, and may contain a conductive additive and a viscosity modifier, for example, if necessary. The amount of the electrolyte solution in the composition is 0.1 to 40.0 wt %.

The composition before molding (the mixture of the active material and the electrolyte solution) is an unbound product of a mixture of the electrode active material for a lithium-ion battery and the electrolyte solution. An electrode active material molded body obtained by molding the composition is also an unbound product of a mixture of the electrode active material for a lithium-ion battery and the electrolyte solution.

Even when the composition contains a conductive additive and a viscosity modifier, for example, the active materials are not bound together by the conductive additive or viscosity modifier. Thus, an electrode active material molded body for a lithium-ion battery obtained by molding the composition containing these components is also an unbound product of a mixture of the electrode active material for a lithium-ion battery and the electrolyte solution.

The composition has an electrolyte solution content of 0.1 to 40 wt % based on the weight of the composition. When the composition has an electrolyte solution content of less than 0.1 wt % based on the weight of the composition, the liquid bridge force is weak, resulting in insufficient shape retainability of the molded body. In contrast, when the composition has an electrolyte solution content of more than 40 wt %, a composition is liquefied, resulting in insufficient shape retainability of the molded body.

The electrolyte solution content in the composition can be adjusted within the above range by adjusting the amount of the electrolyte solution to be added to the active material. The composition preferably has an electrolyte solution content of 5 to 35 wt %, more preferably 10 to 30 wt %, based on the weight of the composition. When the electrolyte solution content is in the above range, a molded body having a high density and high shape retainability can be obtained even with low pressure. In addition, with the use of an electrolyte solution instead of an organic solvent as a process auxiliary material, there is no need to distill off the organic solvent after molding of the molded body, which can significantly decrease the number of steps.

The amount of the electrolyte solution in the composition is sufficient in view of shape retainability during molding of the composition, but may be insufficient to provide sufficient battery performance of the lithium-ion battery. In such a case, the electrolyte solution is additionally added to the molded body, whereby the amount of the electrolyte solution in the molded body can be adjusted. Here, because the electrolyte solution is already present in the molded body, the added electrolyte solution can easily penetrate into the composition, without reducing the pressure or the like, and the time required for absorption of the electrolyte solution can be reduced.

The weight percentage of the active material contained in the composition is preferably 80 to 100 wt % based on the total solids weight of the composition in view of balance between shape retainability and battery performance.

When the electrode active material for a lithium-ion battery is a coated active material in which at least a portion of its surface is coated with a coating agent containing a coating resin, the weight of the coating agent is excluded from the weight of the active material.

In the method of producing a lithium-ion battery of the present invention, that "the composition is an unbound product of a mixture of the active material and the electrolyte solution" means that the position of active materials constituting the composition are not fixed by a binder and that all the active materials in the composition are not bound together.

An active material layer of the conventional lithium-ion battery (which corresponds to the electrode active material molded body in the method of producing a lithium-ion battery of the present invention) is produced by applying slurry in which active materials and a binder are dispersed in a solvent to the surface of a current collector or the like and thermally drying the slurry. Thus, the active material layer is fixed by the binder. The active materials are bound together by the binder, and the position of the active materials is irreversibly fixed.

In contrast, in the method of producing an electrode active material molded body for a lithium-ion battery of the present invention, the electrode active materials for a lithium-ion battery in the electrode active material molded body produced by the method are not bound together, and the position of the electrode active materials for a lithium-ion battery is also not fixed. Thus, when the composition containing the electrode active materials for a lithium-ion battery which are not bound together is taken out, the electrode active materials for a lithium-ion battery in the composition can be easily loosened by hand, and the state of the composition can be checked.

Examples of the binder include known binders for lithium-ion batteries such as starch, polyvinyl alcohol, carboxymethyl cellulose, polyvinylpyrrolidone, tetrafluoroethylene, styrene-butadiene rubber, polyethylene, polypropylene, polyvinylidene fluoride (PVdF), and styrene-butadiene rubber (SBR). Yet, in the method of producing an electrode active material molded body for a lithium-ion battery of the present invention, preferably, these compounds are not added as binders to the composition, and more preferably, these compounds are not used as compounds to constitute a coating agent (described later).

The electrode active material for a lithium-ion battery constituting the electrode active material molded body may be a positive electrode active material or a negative electrode active material.

The composition containing a positive electrode active material as the electrode active material for a lithium-ion battery is also referred to as a "positive electrode composition". The composition containing a negative electrode active material as the electrode active material for a lithium-ion battery is also referred to as a "negative electrode composition". The coating agent in which the electrode active material for a lithium-ion battery is a positive electrode active material is also referred to as a "positive electrode coating agent". The coating agent in which the electrode active material for a lithium-ion battery is a negative electrode active material is also referred to as a "negative electrode coating agent". The electrode active material molded body whose composition is a positive electrode composition is also referred to as a "positive electrode active material molded body". The electrode active material molded body whose composition is a negative electrode composition is also referred to as a "negative electrode active material molded body". The electrode active material molded body unit whose composition is a positive electrode composition is also referred to as a "positive electrode active material molded body unit". The electrode active material molded body unit whose composition is a negative electrode composition is also referred to as a "negative electrode active material molded body unit".

The positive electrode active material molded body is assembled with the negative electrode active material molded body such that their compositions are placed with a separator therebetween, and the assembly is surrounded by a battery housing or the like, whereby a lithium-ion battery is produced.

The positive electrode active material constituting the positive electrode composition may be suitably a conventionally known one. The positive electrode active material can be a compound that is capable of inserting and desorbing lithium ions at a certain electric potential and that is capable of inserting and desorbing lithium ions at a higher electric potential than the negative electrode active material used as a counter electrode.

Examples of the positive electrode active material include complex oxides of lithium and transition metals such as complex oxides containing one transition metal (e.g., $LiCoO_2$, $LiNiO_2$, $LiAlMnO_4$, $LiMnO_2$, and $LiMn_2O_4$), complex oxides containing two transition metal elements (e.g., $LiFeMnO_4$, $LiNi_{1-x}Co_xO_2$, $LiMn_{1-y}Co_yO_2$, $LiNi_{1/3}CO_{1/3}Al_{1/3}O_2$, and $LiNi_{0.8}Co_{0.15}Al_{0.05}O_2$), and complex oxides containing three transition metal elements (e.g., $LiM_aM'_bM''_cO_2$ (M, M' and M" are each a different transition metal element, and a+b+c=1, e.g., $LiNi_{1/3}Mn_{1/3}CO_{1/3}O_2$)); lithium-containing transition metal phosphates (e.g., $LiFePO_4$, $LiCoPO_4$, $LiMnPO_4$, and $LiNiPO_4$); transition metal oxides (e.g., $MnO_2$ and $V_2O_5$), transition metal sulfides (e.g., $MoS_2$ and $TiS_2$); and conductive polymers (e.g., polyaniline, polypyrrole, polythiophene, polyacetylene, poly-p-phenylene, and polyvinylcarbazole). These may be used in combination of two or more thereof.

The lithium-containing transition metal phosphates may be those in which the transition metal site is partially replaced by another transition metal.

In view of electrical characteristics of the lithium-ion buttery, the volume average particle size of the positive electrode active material is preferably 0.01 to 100 µm, more preferably 0.1 to 35 µm, still more preferably 1 to 30 µm.

The following describes the negative electrode active material.

Examples of the negative electrode active material include carbon materials (e.g., graphite, non-graphitizable carbon, amorphous carbon, products obtained by firing resin (e.g., products obtained by firing and carbonating phenol resin and furan resin), coke (e.g., pitch coke, needle coke, and petroleum coke), silicon carbide, and carbon fibers); conductive polymers (e.g., polyacetylene and polypyrrole); metals (e.g., tin, silicon, aluminum, zirconium, and titanium); metal oxides (e.g., titanium oxide, lithium-titanium oxide, and silicon oxide); and metal alloys (e.g., lithium-tin alloy, lithium-silicon alloy, lithium-aluminum alloy; lithium-aluminum-manganese alloy); and mixtures of these materials and a carbon material.

Among these negative electrode active materials, those not containing lithium or lithium ions inside may be pre-doped to allow the active material to partially or entirely contain lithium or lithium ions in advance.

In view of electrical characteristics of the lithium-ion buttery, the volume average particle size of the negative electrode active material is preferably 0.01 to 100 µm, more preferably 0.1 to 40 µm, still more preferably 2 to 35 µm.

As used herein, the term "volume average particle size" of the positive electrode active material and the negative electrode active material refers to the particle size at cumulative 50% (Dv 50) in a particle size distribution determined by the Microtrac method (laser diffraction and scattering method). The Microtrac method determines a particle size distribution by using light scattered from the particles irradiated with laser light. The volume average particle size can be measured using a device such as Microtrac (Nikkiso Co., Ltd.).

The following describes the structure of the active material.

In the method of producing an electrode active material molded body for a lithium-ion battery of the present invention, the electrode active material for a lithium-ion battery is preferably a coated active material in which at least a portion of its surface is coated with a coating agent containing a coating resin. When the electrode active material for a lithium-ion battery is a coated active material, the coating agent containing the electrolyte solution swells and becomes viscous. Thus, the composition can be molded more easily.

The coated active material is an electrode active material for a lithium-ion battery in which at least a portion of its surface is coated with the coating agent containing a coating resin.

The coating agent contains a coating resin, and may further contain a conductive material, if necessary.

The coated active material is one in which at least a portion of the surface of the electrode active material for a lithium-ion battery is coated with the coating agent containing a coating resin. In the composition, even when the coated active materials come into contact with each other, the electrode active materials for a lithium-ion battery are not irreversibly bonded together at the contact surface. The bond is temporary and the coated active materials can be easily loosened by hand. Thus, the electrode active materials for a lithium-ion battery are prevented from being fixed together by the coating agent. Thus, in the composition containing the coated active material, the electrode active materials for a lithium-ion battery are not bound together.

Examples of the coating resin include thermoplastic resins and thermosetting resins, such as fluororesin, acrylic resin, urethane resin, polyester resin, polyether resin, polyamide resin, epoxy resin, polyimide resin, silicone resin, phenol resin, melamine resin, urea resin, aniline resin, ionomer resin, polycarbonate, polysaccharide (e.g., sodium alginate), and mixtures thereof. Preferred among these are acrylic resin, urethane resin, polyester resin, and polyamide resin, and more preferred is acrylic resin.

Among these, a more preferred coating resin is one having a liquid absorption rate of 10% or more when immersed in an electrolyte solution and having a tensile elongation at break of 10% or more when saturated with the electrolyte solution.

The liquid absorption rate of the coating resin when immersed in an electrolyte solution can be determined by measuring the weight of the coating resin before and after immersion in the electrolyte solution and using the following formula.

$$\text{Liquid absorption rate (\%)} = [(<\text{Weight of coating resin after immersion in electrolyte solution}> - <\text{Weight of coating resin before immersion in electrolyte solution}>)/\text{Weight of coating resin before immersion in electrolyte solution}] \times 100$$

The electrolyte solution to be used to determine the liquid absorption rate is preferably an electrolyte solution in which $LiPF_6$ as an electrolyte is dissolved to a concentration of 1 mol/L in a solvent mixture in which ethylene carbonate (EC) and diethyl carbonate (DEC) are mixed in a volume ratio (EC:DEC) of 1:1.

To determine the liquid absorption rate, the coating resin is immersed in the electrolyte solution at 50° C. for 3 days. The coating resin will be saturated with the electrolyte solution after being immersed in the electrolyte solution at 50° C. for 3 days. The term "saturated with the electrolyte solution" refers to the state where the weight of the coating resin does not increase anymore even if the coating resin is immersed in the electrolyte solution for a longer time.

The electrolyte solution to be used for the production of the lithium-ion battery is not limited to the electrolyte solution mentioned above. Any other electrolyte solution may be used.

When the liquid absorption rate is 10% or more, the lithium ions can easily pass through the coating resin, so that ionic resistance in the composition can be maintained at a low level. When the liquid absorption rate is less than 10%, the conductivity of lithium ions may decrease, resulting in poor performance of the lithium-ion battery.

The liquid absorption rate is more preferably 20% or more, still more preferably 30% or more.

The upper limit of the liquid absorption rate is preferably 400%, more preferably 300%.

The tensile elongation at break of the coating resin when saturated with the electrolyte solution can be measured as follows: the coating resin is punched into a dumbbell shape; the dumbbell-shaped coating resin is immersed in an electrolyte solution at 50° for 3 days in the same manner as in the measurement of the liquid absorption rate so as to be saturated with the electrolyte solution; and the tensile elongation at break is measured according to ASTM D683 (specimen's shape: Type II). The tensile elongation at break is the rate of elongation until the specimen breaks in a tensile test as calculated by the following formula:

$$\text{Tensile strength at break (\%)} = [((\text{Specimen's length at break}) - (\text{Specimen's length before test}))/\text{Specimen's length before test}] \times 100$$

The coating resin having a tensile elongation at break of 10% or more when saturated with the electrolyte solution has adequate flexibility. This helps preventing the coating agent from being separated due to volume changes in the electrode active material for a lithium-ion battery during charging and discharging.

The tensile elongation at break is more preferably 20% or more, still more preferably 30% or more.

The upper limit of the tensile elongation at break is preferably 400%, more preferably 300%.

Among these coating resins mentioned above, the one described as the coating resin in WO 2015/005117 can be particularly preferably used as the coating resin constituting the coating agent in the method of producing an electrode active material molded body for a lithium-ion battery of the present invention.

The conductive material is selected from materials having conductivity.

Specific examples thereof include, but not be limited to, metals (e.g., nickel, aluminum, stainless steel (SUS), silver, copper, and titanium), carbon (e.g., graphite and carbon black (e.g., acetylene black, ketjen black, furnace black, channel black, and thermal lamp black)), and mixtures thereof.

These conductive materials may be used alone or in combination of two or more. Alloys or metal oxides thereof may also be used. In view of electrical stability, preferred are aluminum, stainless steel, carbon, silver, copper, titanium, and mixtures thereof, more preferred are silver, aluminum, stainless steel, and carbon, and still more preferred is carbon. These conductive materials may be particulate ceramic materials or resin materials coated with conductive materials (metals among the conductive materials described above) by plating or the like.

The conductive material can have any average particle size. Yet, in view of the electrical characteristics of the lithium-ion buttery, the average particle size is preferably 0.01 to 10 μm, more preferably 0.02 to 5 μm, still more preferably 0.03 to 1 μm.

The term "particle size" refers to the largest distance L among distances between any two points on the outline of a particle. The "average particle size" can be determined as follows: particles are observed with a scanning electron microscope (SEM) or a transmission electron microscope (TEM), for example, and the average of the particle sizes of the particles observed in several to several tens of viewing fields is calculated. The thus calculated value is defined as the average particle size.

The shape (form) of the conductive material is not limited to the particulate form and may be a different form. For example, the conductive material may be a carbon nanotube which has been practically used as a filler-type conductive material.

The conductive material may be in the form of fibrous-shaped conductive fibers.

Examples of the conductive fiber include carbon fibers such as PAN-based carbon fibers and pitch-based carbon fibers; conductive fibers obtained by uniformly dispersing highly conductive metal or graphite in synthetic fibers; metal fibers obtained by making metal such as stainless steel into fibers; conductive fibers obtained by coating the surface of organic fibers with metal; and conductive fibers obtained by coating the surface of organic fibers with a resin containing a conductive substance. Among these conductive fibers, carbon fibers are preferred. Polypropylene resin into which graphene has been kneaded is also preferred.

When the conductive material is in the form of conductive fibers, the average fiber diameter is preferably 0.1 to 20 μm.

The following describes a case where the electrode active material for a lithium-ion battery is a positive electrode active material.

The total weight percentage of the coating resin and the conductive material relative to the weight of the positive electrode active material is not limited, but it is preferably 2 to 25 wt %.

The weight percentage of the coating resin relative to the weight of the positive electrode active material is not limited, but it is preferably 0.1 to 10 wt %. The weight percentage of the conductive material relative to the weight of the positive electrode active material is not limited, but it is preferably 2 to 15 wt %.

The conductivity of the positive electrode coating agent is preferably 0.001 to 10 mS/cm, more preferably 0.01 to 5 mS/cm.

The conductivity of the positive electrode coating agent can be measured by the four-terminal method.

When the conductivity of the positive electrode coating agent is 0.001 mS/cm or more, the electric resistance to the positive electrode active material molded body is unlikely to increase.

The following describes a case where the electrode active material for a lithium-ion battery is a negative electrode active material.

The total weight percentage of the coating resin and the conductive material contained in the negative electrode coating agent is not limited, but it is preferably 25 wt % or less relative to the weight of the negative electrode active material.

The weight percentage of the coating resin relative to the weight of the negative electrode active material is not limited, but it is preferably 0.1 to 20 wt %.

The weight percentage of the conductive material relative to the weight of the negative electrode active material is not limited, but it is preferably 10 wt % or less.

Examples of the conductive additive that may be contained in the composition include those of the conductive material that may be contained in the coating agent.

The following describes the electrolyte solution.

The electrolyte solution may be one containing an electrolyte and a non-aqueous solvent, which is used in the production of a lithium-ion battery.

The electrolyte may be one that is used in known electrolyte solutions. Examples include electrolytes containing lithium salts of inorganic acids such as $LiPF_6$, $LiBF_4$, $LiSbF_6$, $LiAsF_6$, and $LiClO_4$, imide-based electrolytes such as $LiN(SO_2CF_3)_2$ and $LiN(SO_2C_2F_5)_2$, and alkyl lithium-based electrolyte such as $LiC(SO_2CF_3)_3$. Among these, $LiPF_6$ is preferred in view of ion conductivity and thermal decomposition temperature when the concentration of the electrolyte solution is high. $LiPF_6$ may be used in combination with another electrolyte but is more preferably used alone.

The concentration of the electrolyte solution is not limited, but it is preferably 0.5 to 5 mol/L, more preferably 0.8 to 4 mol/L, still more preferably 1 to 2 mol/L.

The non-aqueous solvent can be one that is used in known electrolyte solutions. Examples include lactone compounds, cyclic or acyclic carbonate esters, acyclic carboxylate esters, cyclic or acyclic ethers, phosphate esters, nitrile compounds, amide compounds, sulfone, and mixtures thereof.

Examples of the lactone compounds include 5-membered lactone compounds (e.g., γ-butyrolactone and γ-valerolactone) and 6-membered lactone compounds (e.g., δ-valerolactone).

Examples of the cyclic carbonate esters include propylene carbonate, ethylene carbonate, and butylene carbonate.

Examples of the acyclic carbonate esters include dimethyl carbonate, methyl ethyl carbonate, diethyl carbonate, methyl-n-propyl carbonate, ethyl-n-propyl carbonate, and di-n-propyl carbonate.

Examples of the acyclic carbonate esters include methyl acetate, ethyl acetate, propyl acetate, and methyl propionate.

Examples of the cyclic ethers include tetrahydrofuran, tetrahydropyran, 1,3-dioxolan, and 1,4-dioxane.

Examples of the acyclic ethers include dimethoxymethane and 1,2-dimethoxyethane.

Examples of the phosphate esters include trimethyl phosphate, triethyl phosphate, ethyl dimethyl phosphate, diethyl methyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholan-2-one, 2-trifluoroethoxy-1,3,2-dioxaphospholan-2-one, and 2-methosyethoxy-1,3,2-dioxaphospholan-2-one.

Examples of the nitrile compounds include acetonitrile. Examples of the amide compounds include DMF. Examples of the sulfone include acyclic sulfones such as dimethyl sulfone and diethyl sulfone and cyclic sulfones such as sulfolane.

Each of these non-aqueous solvents may be used alone or in combination of two or more thereof.

Among these non-aqueous solvents, lactone compounds, cyclic carbonate esters, acyclic carbonate esters, and phosphate esters are preferred in view of output and charge/discharge cycle characteristics of the lithium-ion battery. More preferred are lactone compounds, cyclic carbonate esters, and acyclic carbonate esters. Particularly preferred are cyclic carbonate esters and mixtures of a cyclic carbonate ester and an acyclic carbonate ester. The most preferred are a mixture of ethylene carbonate (EC) and propylene carbonate (PC), a mixture of ethylene carbonate (EC) and dimethyl carbonate (DMC), and a mixture of ethylene carbonate (EC) and diethyl carbonate (DEC).

The following describes a first embodiment of the method of producing a lithium-ion battery of the present invention.

The first embodiment of the method of producing a lithium-ion battery of the present invention at least includes an assembly step of placing the electrode active material molded body for a lithium-ion battery produced by the method of producing an electrode active material molded body for a lithium-ion battery of the present invention in an accommodating portion formed in at least a portion of a battery housing, and integrating the electrode active material molded body with the battery housing to prepare an electrode structure.

In the first embodiment of the method of producing a lithium-ion battery of the present invention, the electrode active material for a lithium-ion battery is preferably a coated active material in which at least a portion of its surface is coated with a coating agent containing a coating resin. When the electrode active material for a lithium-ion battery is a coated active material, the coating agent containing the electrolyte solution swells and becomes viscous. Thus, the composition can be molded more easily.

The first embodiment of the method of producing a lithium-ion battery of the present invention is described with reference to FIG. 5A, FIG. 5B, and FIG. 5C. A molding step in the first embodiment of the method of producing a lithium-ion battery of the present invention is the same as the molding step constituting the method of producing an electrode active material molded body for a lithium-ion battery of the present invention. Thus, a description thereof is omitted.

Figure 5A:
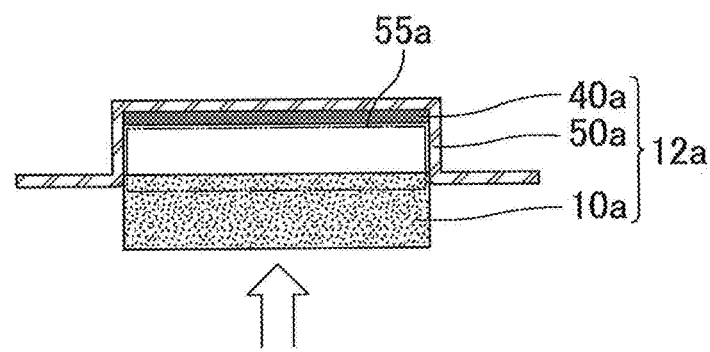
FIG. 5A, FIG. 5B, and FIG. 5C are schematic views showing an exemplary method of producing a lithium-ion battery of the present invention.
Figure 5B:
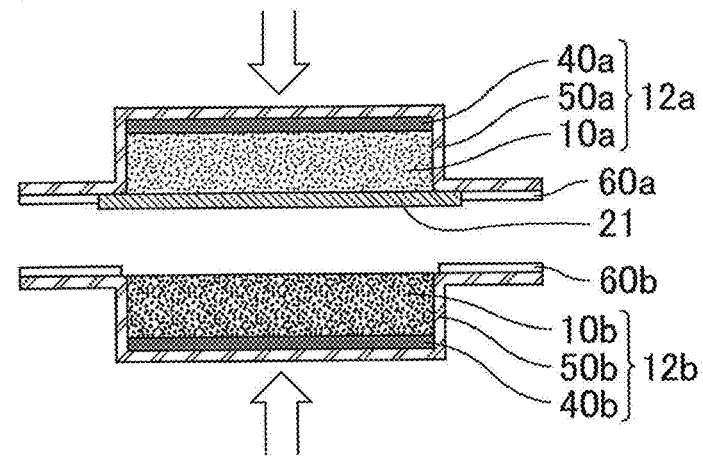
Figure 5C:
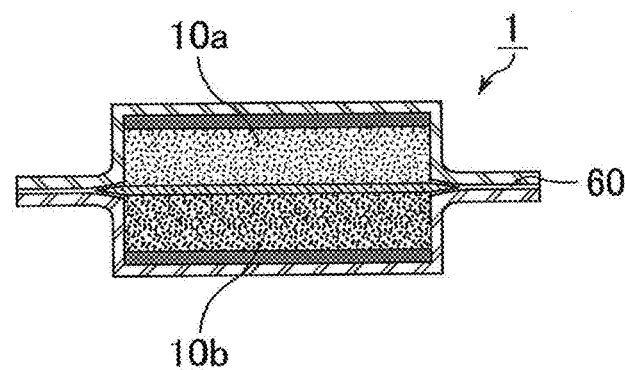

FIG. 5A, FIG. 5B, and FIG. 5C are schematic views showing an exemplary method of producing a lithium-ion battery of the present invention. FIG. 5A is an illustration schematically showing an exemplary assembly step. FIG. 5B and FIG. 5C are schematic views showing an exemplary method of producing a lithium-ion battery using an electrode structure prepared in the assembly step.

As shown in FIG. 5A, in the assembly step, a positive electrode active material molded body 10a is placed in a positive electrode accommodating portion 55a formed in at least a portion of a positive electrode housing 50a, and the positive electrode active material molded body 10a is integrated with the positive electrode housing 50a, whereby a positive electrode structure 12a is obtained.

Here, when the inner surface (a surface that comes into contact with the positive electrode active material molded body 10a) of the positive electrode housing 50a does not sufficiently function as a positive electrode current collector, another positive electrode current collector 40a may be placed to be in contact with the positive electrode active material molded body 10a as shown in FIG. 5A.

The following describes a method of producing a lithium-ion battery using the electrode structure obtained in the assembly step with reference to FIG. 5B and FIG. 5C. The production of a lithium-ion battery using the electrode structure obtained in the assembly step requires two different types of electrodes having different active materials.

FIG. 5B and FIG. 5C describe a method of producing a lithium-ion battery using a positive electrode structure in which the electrode active material is a positive electrode active material and a negative electrode structure in which the electrode active material is a negative electrode active material.

As shown in FIG. 5B, the positive electrode structure 12a in which the electrode active material molded body is the positive electrode active material molded body 10a and a negative electrode structure 12b in which the electrode active material molded body is a negative electrode active material molded body 10b are placed to face each other with a separator 21 therebetween. The structure of the negative electrode structure 12b is substantially the same as that of the positive electrode structure 12a, and a negative electrode current collector 40b is placed between the negative electrode active material molded body 10b and a negative electrode housing 50b.

An insulating adhesive resin layer 60a is placed on a surface of the positive electrode housing 50a opposite to the negative electrode housing 50b, excluding the portion where the accommodating portion is formed. An insulating adhesive resin layer 60b is placed on a surface of the positive electrode housing 50b opposite to the positive electrode housing 50a, excluding a portion where the accommodating portion is formed. This prevents direct contact between the positive electrode housing 50a and the negative electrode housing 50b, thus preventing a short circuit. Thus, when a sealing step of bonding and sealing the positive electrode housing 50a and the negative electrode housing 50b together by the adhesive resin layers 60a and 60b is performed, a lithium-ion battery 1 is obtained in which the positive electrode housing 50a and the negative electrode housing 50b are sealed together by an adhesive resin layer 60 as shown in FIG. 5C.

The method of producing a lithium-ion battery of the present invention may use electrode active material molded body units each in which the electrode active material molded body is integrated with the separator, instead the electrode active material molded bodies described in FIG. 5A, FIG. 5B, and FIG. 5C.

A method of producing a lithium-ion battery using an electrode active material molded body unit is described with reference to FIG. 6A, FIG. 6B, and FIG. 6C.

Figure 6A:
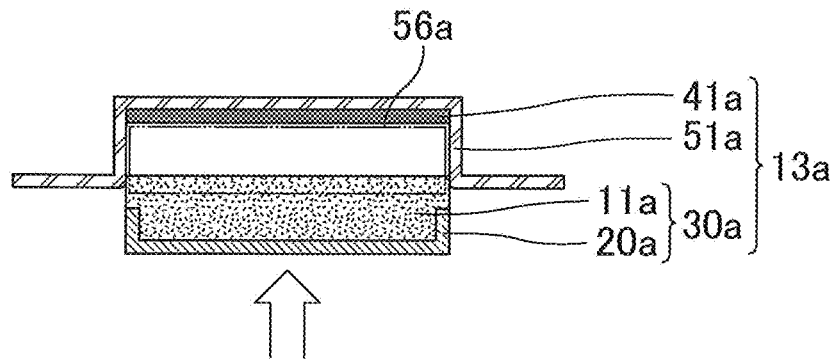
FIG. 6A, FIG. 6B, and FIG. 6C are schematic views showing another exemplary method of producing a lithium-ion battery of the present invention.
Figure 6B:
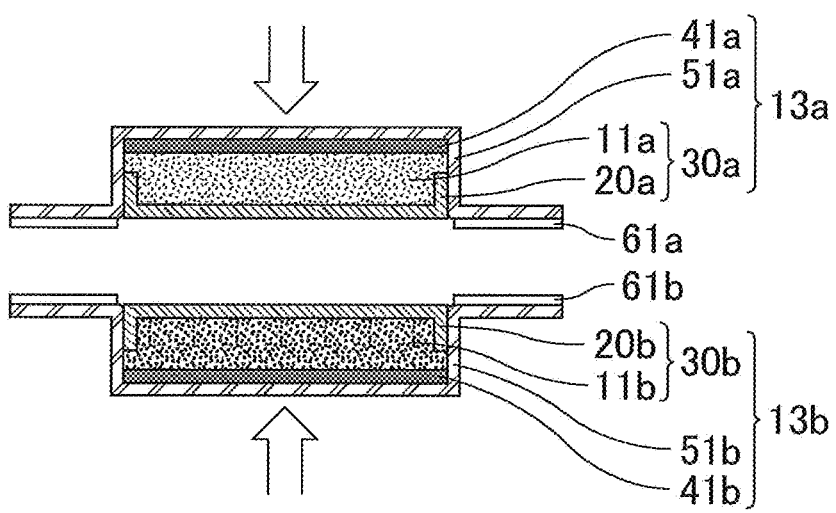
Figure 6C:
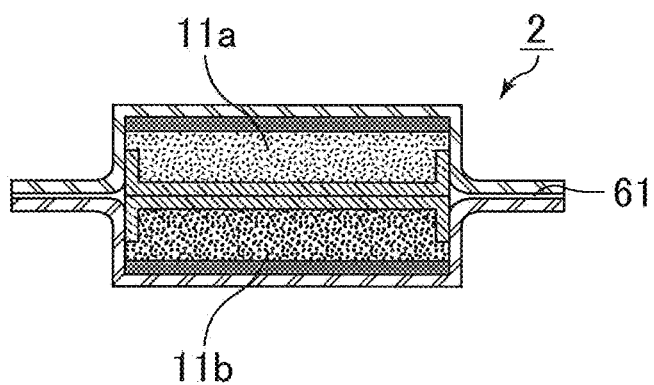

FIG. 6A, FIG. 6B, and FIG. 6C are schematic views showing another exemplary method of producing a lithium-ion battery of the present invention.

FIG. 6A is an illustration schematically showing another exemplary assembly step. FIG. 6B and FIG. 6C are illustrations schematically showing another exemplary method of producing a lithium-ion battery using the electrode structure obtained in the assembly step.

As shown in FIG. 6A, in the assembly step, a positive electrode active material molded body unit 30a in which a positive electrode active material molded body 11a is integrated with the separator 20a is accommodated into a positive electrode accommodating portion 56a of a positive electrode housing 51a. The separator 20a is placed opposite to the positive electrode housing 51a across the positive electrode active material molded body 11a, and a positive electrode current collector 41a is placed between the positive electrode housing 51a and the positive electrode active material molded body 11a.

As shown in FIG. 6B, in a positive electrode structure 13a, the positive electrode active material molded body unit 30a is accommodated in the positive electrode accommodating portion 56a of the positive electrode housing 51a. In a negative electrode structure 13b, a negative electrode active material molded body unit 30b in which a negative electrode active material molded body lib is integrated with the separator 20b is accommodated in the accommodating portion of the negative electrode housing 51b, and a negative electrode current collector 41b is placed between the negative electrode active material molded body unit 30b and the negative electrode housing 51b. The positive electrode structure 13a and the negative electrode structure 13b are bonded together by an adhesive resin layer 61 (61a, 61b), whereby a lithium-ion battery 2 shown in FIG. 6C is obtained.

With the use of the units each in which the electrode active material molded body is integrated with the separator, a step of placing the separator as shown in FIG. 5B can be omitted, thus simplifying the production process. When placing the separator, it is required to place the separator in such a manner that the separator covers the area larger than the contact area between the positive electrode active material and the negative electrode active material in order to prevent contact between the positive electrode active material and the negative electrode active material. In this case, the minimum area that can seal the battery housing is increased by the area of the separator sticking out of the contact area between the positive electrode active material and the negative electrode active material. When the electrode active material molded body units are used, it is possible to increase the volume ratio of the positive electrode active material and the negative electrode active material to the entire lithium-ion battery.

In the method of producing a lithium-ion battery of the present invention, the electrode active material molded body unit prepared in the assembly step may be one in which the electrode active material molded body sticks out of the accommodating portion of the battery housing.

In such a case, a lithium-ion battery can be produced by compressing the electrode active material molded body when sealing the battery housings.

Such a case is described with reference to FIG. 7A, FIG. 7B, and FIG. 7C.

Figure 7A:
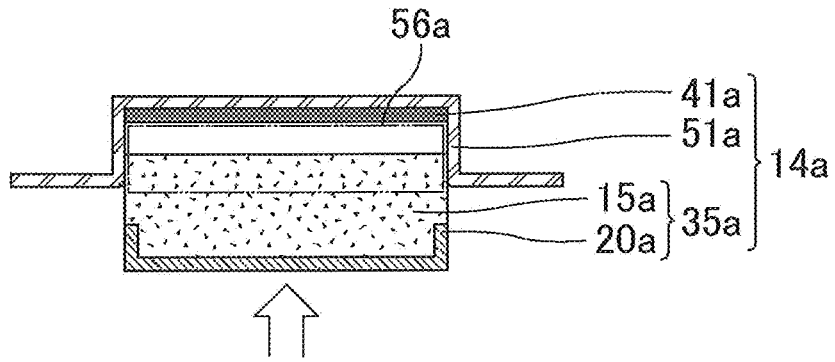
FIG. 7A, FIG. 7B, and FIG. 7C are schematic views showing still another exemplary method of producing a lithium-ion battery of the present invention.
Figure 7B:
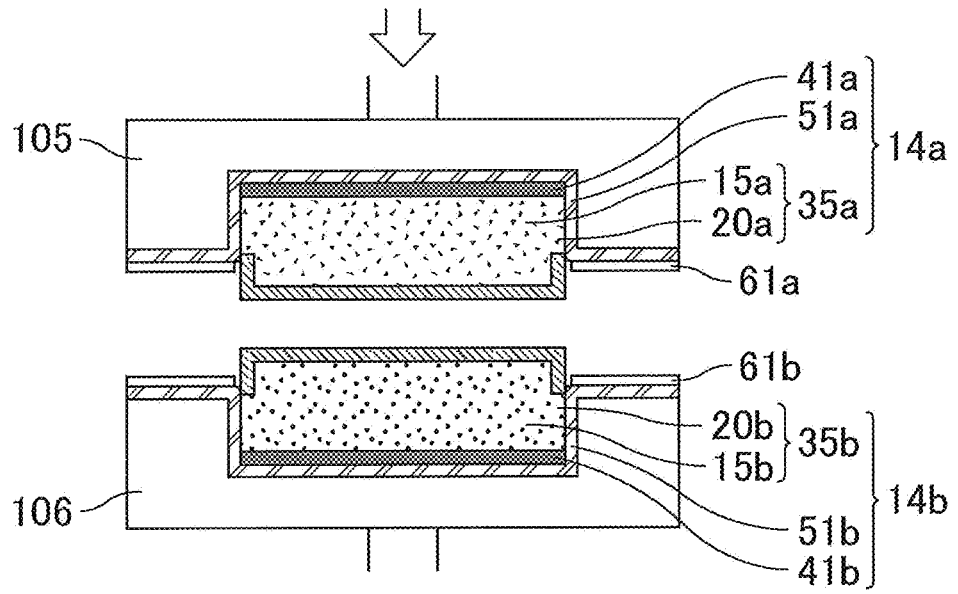
Figure 7C:
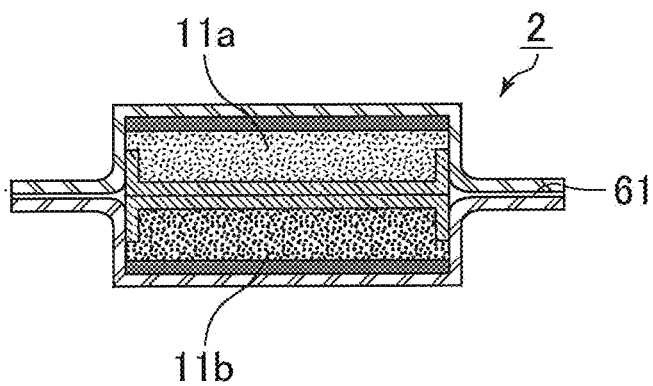

FIG. 7A, FIG. 7B, and FIG. 7C are schematic views showing still another exemplary method of producing a lithium-ion battery of the present invention. FIG. 7A is an illustration schematically showing another exemplary assembly step in the method of producing a lithium-ion battery of the present invention. FIG. 7B and FIG. 7C are illustrations schematically showing a method of producing a lithium-ion battery using the electrode structure prepared in the assembly step.

As shown in FIG. 7A, in the assembly step, a positive electrode active material molded body unit 35a in which a positive electrode active material molded body 15a is integrated with the separator 20a is accommodated into the positive electrode accommodating portion 56a of the positive electrode housing 51a, whereby a positive electrode structure 14a is prepared.

The positive electrode active material molded body unit 35a corresponds to an electrode active material molded body unit that can be obtained by performing compression up to the molding step shown in FIG. 4D but not continuing the compression until the molding step shown in FIG. 4E.

The volume of the positive electrode accommodating portion 56a is smaller than the total volume of the positive electrode active material molded body 15a and the separator 20a. Thus, as shown in FIG. 7B, the positive electrode active material molded body unit 35a partially sticks out of the positive electrode accommodating portion 56a of the positive electrode housing 51a.

In FIG. 7B, as in the case with the positive electrode structure 14a, a negative electrode active material molded body unit 35b of a negative electrode structure 14b also sticks out from a negative electrode accommodating portion of the negative electrode housing 51b. As shown in FIG. 7B, while the positive electrode active material molded body 15a and a negative electrode active material molded body 15b are compressed using jigs 105 and 106, the sealing step is performed in which the positive electrode housing 51a and the negative electrode housing 51b are bonded and sealed together by the adhesive resin layer 61 (61a, 61b), whereby the lithium-ion battery 2 shown in FIG. 7C is obtained.

As shown in FIG. 7B and FIG. 7C, the positive electrode active material molded body 15a and the negative electrode active material molded body 15b are compressed to the same density as that in the molding step shown in FIG. 4E, whereby the positive electrode active material molded body 15a and the negative electrode active material molded body 15b are compressed into the positive electrode active material molded body 11a and the negative electrode active material molded body 11b, respectively, and the lithium-ion battery 2 shown in FIG. 7C which is the same as the lithium-ion battery 2 shown in FIG. 6C is obtained.

In the assembly step, the electrode active material molded body obtained in the molding step is placed in the accommodating portion formed in at least a portion of the battery housing, and the electrode active material molded body is integrated with the battery housing, whereby an electrode structure is prepared.

The method of placing the electrode active material molded body in the accommodating portion of the battery housing is not limited. Examples include a method in which the battery housing is placed to cover the electrode active material molded body placed on a smooth surface, and a method in which the electrode active material molded body is placed to be accommodated in the accommodating portion of the battery housing placed on the smooth surface.

The battery housing may also function as a current collector, or a current collector may be placed on the inner surface of the battery housing (on the surface that comes into contact with the electrode active material molded body).

Suitable examples of a material that functions as a current collector include materials of a metal current collector and materials of a resin current collector formed of a conducting agent and a resin. The metal current collector may be, for example, a thin sheet or foil of one or more metal materials selected from the group consisting of copper, aluminum, titanium, nickel, tantalum, niobium, hafnium, zirconium, zinc, tungsten, bismuth, antimony, an alloy containing at least one of these materials, and a stainless steel alloy; or a substrate in which the metal material is formed on its surface by a means such as sputtering, electrodeposition, or application.

The battery housing may be one including a resin layer formed from an insulating resin on a portion or the whole of the surface of the current collector. Examples of the current collector including a resin layer on its surface include laminated aluminum foil (an aluminum laminated film).

The resin layer may consist of a single layer or a laminate. Preferably, a portion of the battery housing which comes into contact with the other battery housing constituting the counter electrode is provided with a layer formed from an adhesive resin capable of allowing the battery housings to adhere to each other. The resin layer formed from the adhesive resin is also referred to as an "adhesive resin layer".

The adhesive resin layer is not limited as long as it is a material having adhesiveness to a battery housing material and durability against the electrolyte solution. For example, a polymer material, particularly a thermosetting resin or a thermoplastic resin, is preferred. Specific examples include epoxy resin, polyolefin resin, polyurethane resin, and polyvinylidene fluoride resin. Epoxy resin is preferred in view of high durability and easy handleability. The resin adhesive layer can be, for example, double-sided tape made of the above material (one formed by applying the thermosetting resin or thermoplastic resin to both sides of a flat substance). For example, a known one such as a three-layer sealing film (e.g., a film obtained by laminating modified polypropylene films or epoxy resin films with a polyethylene naphthalate film therebetween).

Preferred examples of the conducting agent constituting the resin current collector include the same conductive materials that may be contained in the coating agent.

The battery housing includes an accommodating portion at least in a portion thereof, and the volume of the accommodating portion is sufficient to accommodate the entire or a portion of the electrode active material molded body to be accommodated therein. Preferably, the volume of the accommodating portion is equal to or smaller than the volume of the electrode active material molded body.

When the volume of the accommodating portion is smaller than the volume of the electrode active material molded body to be accommodated, the positive electrode housing and the negative electrode housing do not come into contact with each other simply by placing the positive electrode housing and the negative electrode housing to face each other, so that sealing cannot be performed. For this reason, the present invention involves sealing the positive electrode housing and the negative electrode housing together while compressing the positive electrode active material molded body and the negative electrode active material molded body, whereby the electrode active material molded body is compressed.

When the electrode active material molded body is compressed, force is applied to the active material constituting the electrode active material molded body in the expansion direction. Thus, it is possible to maintain good contact between the electrode active material molded body and the current collector and good contact between the active materials constituting the electrode active material molded body. The size and shape of the accommodating portion are not limited, but the volume of the accommodating portion is preferably 50 to 96 vol % of the volume of the electrode active material molded body to be accommodated.

The shape of the accommodating portion is not limited, but the shape is preferably not so complicated, considering compression of the electrode active material molded body. For example, the shape is preferably one that is substantially circular in a plan view and substantially rectangular in a cross-sectional view, or one that is polygonal in a plan view and substantially rectangular in a cross-sectional view. In the case where the accommodating portion has a shape with corners such as a polygon or the like in a plan view, the corners may be rounded.

The battery housing may be a battery housing in which multiple accommodating portions are regularly placed at regular intervals. Use of such a battery housing makes it possible to obtain an electrode structure in which the electrode active material molded body is placed in each accommodating portion. The thus-obtained electrode structure may be cut by each accommodating portion, if necessary, before or after the assembly step.

Further, when different types of electrode active material molded bodies are alternatively placed in the accommodating portions, it is possible to prepare a continuous product of the electrode structures in which the positive electrode structures and the negative electrode structures are connected together. Such a continuous product of the electrode structures is preferred because the positive electrode active material molded body and the negative electrode active material molded body can be arranged to face each other by bending the battery housing, which can simplify the production process.

In the method of producing a lithium-ion battery of the present invention, the molding step and the assembly step may be performed simultaneously. In an exemplary method of simultaneously performing the molding step and the assembly step, the battery housing including an accommodating portion at least in a portion thereof is placed in a mold having a predetermined shape such that the shape of the accommodating portion fits the shape of the mold, a composition is injected into the accommodating portion, and the composition is compression-molded by a jig or the like. With such a method, the molding step and the assembly step can be performed simultaneously.

The molding step and the assembly step may be performed continuously in the same site, or the assembly step may be performed in a different site after the molding step is performed.

In the first embodiment of the method of producing a lithium-ion battery of the present invention, the positive electrode structure or the negative electrode structure is produced in the molding step. Yet, it is preferred that both the positive electrode structure and the negative electrode structure are produced in the molding step.

In the method of producing a lithium-ion battery of the present invention, as described below, three or more electrode active material molded bodies may be accommodated in the battery housing.

A second embodiment of the method of producing a lithium-ion battery of the present invention includes: an accommodating step of accommodating the electrode active material molded body for a lithium-ion battery produced by the method of producing an electrode active material molded body for a lithium-ion battery of the present invention into a battery housing, wherein in the molding step, a positive electrode active material molded body in which the electrode active material for a lithium-ion battery is a positive electrode active material and a negative electrode active material molded body in which the electrode active material for a lithium-ion battery is a negative electrode active material are prepared, and in the accommodating step, the positive electrode active material molded body and the negative electrode active material molded body are accommodated into the battery housing such that a plurality of battery elements each including the positive electrode active material molded body and the negative electrode active material molded body with a separator therebetween are connected in parallel or series.

The molding step in the second embodiment of the method of producing a lithium-ion battery of the present invention is the same as the molding step of the method of producing an electrode active material molded body for a lithium-ion battery of the present invention and the molding step in the first embodiment of the method of producing a lithium-ion battery of the present invention.

Yet, the second embodiment prepares two types of molded bodies, i.e., a positive electrode active material molded body in which the electrode active material for a lithium-ion battery is a positive electrode active material and a negative electrode active material molded body in which the electrode active material for a lithium-ion battery is a negative electrode active material.

In the second embodiment of the method of producing a lithium-ion battery of the present invention, the electrode active material for a lithium-ion battery is preferably a coated active material in which at least a portion of its surface is coated with a coating agent containing a coating resin. When the electrode active material for a lithium-ion battery is a coated active material, the coating agent containing the electrolyte solution swells and becomes viscous. Thus, the composition can be molded more easily.

The following describes the accommodating step in the second embodiment of the method of producing a lithium-ion battery of the present invention.

In the accommodating step, a positive electrode active material molded body, a negative electrode active material molded body, a current collector, and a separator are suitably accommodated into the battery housing. Here, the positive electrode active material molded body, the negative electrode active material molded body, the current collector, and the separator are accommodated such that battery elements will be connected in parallel or series, assuming that each battery element includes the positive electrode active material molded body and the negative electrode active material molded body with the separator therebetween.

Specific examples are described with reference to FIG. 8, FIG. 9, and FIG. 10.

First, a battery element in which the positive electrode active material molded body and the negative electrode active material molded body are placed with the separator therebetween is described with reference to FIG. 8.

Figure 8:
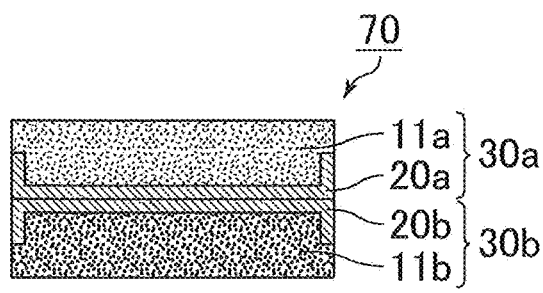
FIG. 8 is a schematic view showing a battery element in order to describe arrangement of a positive electrode active material molded body and a negative electrode active material molded body in the method of producing a lithium-ion battery of the present invention.

FIG. 8 is a schematic view showing a battery element in order to describe arrangement of the positive electrode active material molded body and the negative electrode active material molded body in the method of producing a lithium-ion battery of the present invention.

As shown in FIG. 8, a battery element 70 includes the positive electrode active material molded body 11a and the negative electrode active material molded body 11b with the separators 20a and 20b therebetween. In the battery element 70, the positive electrode active material and the negative electrode active material are placed to face each other with the separators therebetween, so that the battery element 70 functions as a lithium-ion battery with a current collector placed at each end.

The battery element 70 is an expedient unit used to describe the arrangement of the positive electrode active material molded body, the negative electrode active material molded body, the separator, and the current collector. The actual preparation of the battery element 70 is not required.

In the method of producing a lithium-ion battery of the present invention, in the accommodating step, the current collector, the separator, and the positive electrode active material molded body and/or negative electrode active material molded body prepared in the molding step are suitably accommodated into the battery housing, whereby a lithium-ion battery can be produced. In other words, the method of producing a lithium-ion battery of the present invention may be a method that includes preparing the battery element 70 and suitably accommodating the battery element 70 and the current collector into the battery housing, or a method that includes suitably arranging the positive electrode active material molded body, the negative electrode active material molded body, the separator, and the current collector in the battery housing.

The battery element 70 shown in FIG. 8 includes two separators (20a and 20b), but the number of the separators is not limited to two. Only one separator may be placed or three or more separators may be placed. The separator does not have to be placed in the manner as shown in FIG. 8 as long as the separator is placed such that direct contact between the positive electrode active material molded body and the negative electrode active material molded body is prevented.

First, a case where the battery elements are connected in series is described with reference to FIG. 9.

Figure 9:
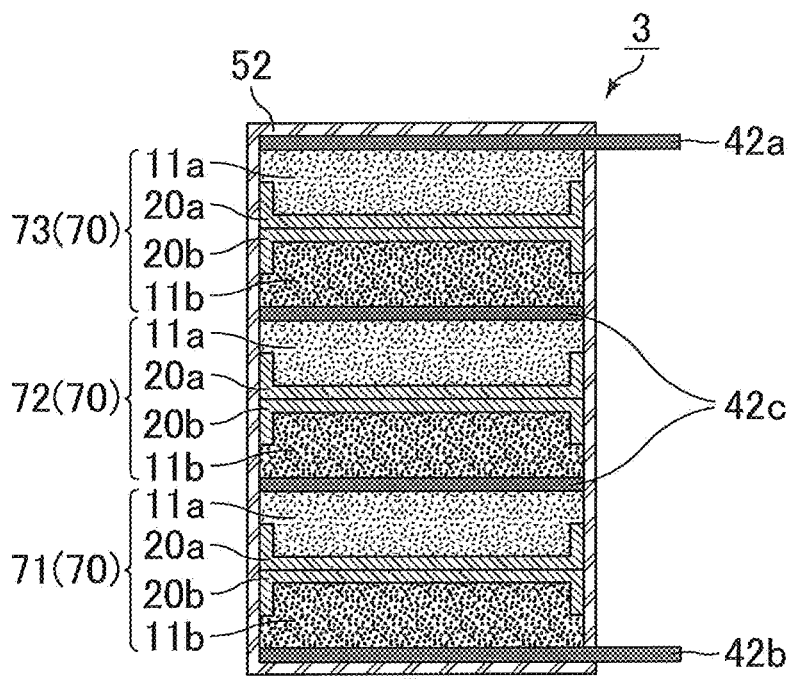
FIG. 9 is a schematic view showing an exemplary lithium-ion battery produced by the method of producing a lithium-ion battery of the present invention.

FIG. 9 is a schematic view showing an exemplary lithium-ion battery produced by the method of producing a lithium-ion battery of the present invention, and shows a case where the battery elements are connected in series.

As shown in FIG. 9, a lithium-ion battery 3 can be obtained by hermetically sealing a battery housing 52 having an insulating inner surface, with the multiple battery elements 70 placed in series therein. In the lithium-ion battery 3, the bottom of a battery element 71 placed on the bottom stage is electrically connected to a negative electrode current collector 42b, and the top of a battery element 73 placed on the top stage is electrically connected to a positive electrode current collector 42a. A bipolar current collector 42c is placed between a battery element 72 placed in the middle stage and the battery element 71 placed on the bottom stage and is also placed between the battery element 72 and the battery element 73 placed on the top stage. The bipolar current collector 42c functions as both a positive electrode current collector and a negative electrode current collector.

FIG. 9 illustrates an embodiment in which the positive electrode current collector 42a and the negative electrode current collector 42b are exposed from the battery housing 52 and thus function as terminals for extracting current. Yet, the embodiment of the terminals for extracting current is not limited to the embodiment shown in FIG. 9. In another embodiment, the positive electrode current collector 42a and the negative electrode current collector 42b may not be exposed from the battery housing 52. Instead, the positive electrode current collector 42a and the negative electrode current collector 42b may be individually connected to terminals for extracting current in the battery housing 52, and these terminals may be exposed to the outside of the battery housing 52.

The bipolar current collector is not limited as long as it is a current collector that functions as a positive electrode current collector on the side in contact with a positive electrode active material, and functions as a negative electrode current collector on the side in contact with a negative electrode active material.

Examples of the bipolar current collector include one in which a positive electrode current collector and a negative electrode current collector are joined together by a conductive adhesive or by welding, for example, and a resin current collector that can be used both as a positive electrode current collector and a negative electrode current collector.

The following describes a case where the battery elements are connected in parallel with reference to FIG. 10.

FIG. 10 is a schematic view showing another exemplary lithium-ion battery produced by the method of producing a lithium-ion battery of the present invention, and shows a case where the battery elements are connected in parallel.

In a lithium-ion battery 4 shown in FIG. 10, the battery elements 70 are connected in parallel and accommodated in a battery housing 53 having an insulating inner surface.

The side of the battery element 70 shown in FIG. 10 is covered with an insulating sealing material 80, and a positive electrode current collector 43a and a negative electrode current collector 43b penetrate through the sealing material 80 and connected to a positive electrode terminal 44 and a negative electrode terminal 45, respectively.

A battery element 74 placed on the first stage from the bottom and a battery element 75 placed on the second stage from the bottom are arranged such that the positive electrode active material molded bodies 11a of these cells face each other with the positive electrode current collector 43a therebetween. As in the case with the battery elements on the first stage and the second stage, a battery element 76 placed on the third stage and a battery element 77 placed on the fourth stage are also arranged such that the positive electrode active material molded bodies 11a of these cells face each other with a positive electrode 43a therebetween. These two positive electrode current collectors 43a are connected to the positive electrode terminal 44 exposed to the outside from the battery housing 53. The battery element 74 placed on the first stage includes the negative electrode active material molded body 11b on is bottom side. The battery element 77 placed on the fourth stage includes the negative electrode active material molded body 11b on its upper side. These negative electrode active material molded bodies 11b are separately in contact with the negative electrode current collectors 43b. The battery element 75 placed on the second stage and the battery element 76 placed on the third stage are arranged such that the negative electrode active material molded bodies lib of these cells face each other with the negative electrode current collector 43b therebetween. The three negative electrode current collectors 43b are connected to the negative electrode terminal 45 exposed to the outside of the battery housing 53.

All the positive electrode active material molded bodies 11a constituting the lithium-ion battery 4 are connected to the positive electrode terminal 44 via the positive electrode current collectors 43a. All the negative electrode active material molded bodies 11b are connected to the negative electrode terminal 45 via the negative electrode current collectors 43b. Thus, the four battery elements 70 (74, 75, 76, and 77) are considered to be connected in parallel in the battery housing 53.

The sealing material 80 prevents contact between the positive electrode members (the positive electrode current collectors and the positive electrode active material molded bodies) and the negative electrode members (the negative electrode current collectors and the negative electrode active material molded bodies). Thus, use of the sealing material 80 is not required when a different method of preventing contact between the positive electrode members and the negative electrode members is employed. The different method may be, for example, one that prevents contact between these members by placing a different insulating material, or one that prevent contact by covering the entire electrode active material molded body with the separator.

In the lithium-ion battery 3 shown in FIG. 9, three battery elements 70 are connected in series in the battery housing 52. In the lithium-ion battery 4 shown in FIG. 10, the four battery elements 70 are connected in parallel in the battery housing 53. Yet, in the second embodiment of the method of producing a lithium-ion battery of the present invention, the number of battery elements is not limited as long as there are two or more battery elements.

When the lithium-ion battery of the present invention includes two or more positive electrode active material molded bodies and two or more negative electrode active material molded bodies, the structure of the minimum unit (cell) of the lithium-ion battery is not limited to the structure of the battery element 70 shown in FIG. 8.

In addition to the structure in which the battery elements 70 are stacked in the battery housing as illustrated in FIG. 9 and FIG. 10, examples of the structure of the lithium-ion battery of the present invention include one obtained by suitably stacking battery elements each in which a stack of a positive electrode active material molded body and a negative electrode active material molded body with a separator therebetween is sealed between a positive electrode current collector and a negative electrode current collector; one obtained by further stacking multiple lithium-ion batteries 1 and 2 shown in FIG. 5C, FIG. 6C, and FIG. 7C in the battery housing; and one in which lithium-ion batteries are prepared as cells (single cells) by using battery housing materials 50 and 51 that also function as current collectors in FIG. 5C, FIG. 6C, and FIG. 7C, and these cells are stacked in a battery housing.

When the battery housing materials 50 (50a and 50b) and the battery housings 51 (51a and 51b) that also function as current collectors are used in FIG. 5C, FIG. 6C, and FIG. 7C, the current collectors 40 (40a and 40b) and the current collectors 41 (41a and 41b) may or may not be separately placed.

The sealing material (also referred to as a "sealing member") can be the same as the resin adhesive layer described above.

When multiple electrode active material molded bodies are accommodated in the battery housing such that the battery elements are connected in series or in parallel, it facilitate designing of capacity and voltage of electricity storage devices, for example.

Further, the lithium-ion battery obtained by the method of producing a lithium-ion battery of the present invention may be housed in a laminated package, a battery case, or the like. When the lithium-ion battery obtained by the method of producing a lithium-ion battery of the present invention is house in a laminated package, a battery case, or the like, terminals for extracting current may be mounted on the battery housing.

EXAMPLES

An exemplary embodiment of the present invention is specifically described below with reference to non-limiting examples, and various modifications may be made without departing from the scope of the present invention. The "part(s)" and "%" refer to part(s) by weight and % by weight, respectively, unless otherwise specified.

Production Example 1: Production of Coating Polymer Compound and its Solution

A four-necked flask equipped with a stirrer, a thermometer, a reflux condenser, a dropping funnel, and a nitrogen gas inlet tube was charged with DMF (407.9 parts), and the temperature was raised to 75° C. Subsequently, a monomer mixture containing methacrylic acid (242.8 parts), methyl methacrylate (97.1 parts), 2-ethylhexyl methacrylate (242.8 parts), and DMF (116.5 parts), and an initiator solution containing 2,2'-azobis(2,4-dimethylvaleronitrile) (1.7 parts) and 2,2'-azobis(2-methylbutyronitrile) (4.7 parts) dissolved in DMF (58.3 parts) were continuously dropped through the dropping funnel over 2 hours under stirring, while nitrogen was blown into the four-necked flask, to carry out radical polymerization. After the completion of dropping, the reaction was continued at 75° C. for 3 hours. Then, the temperature was raised to 80° C., and the reaction was continued for 3 hours, whereby a copolymer solution having a resin concentration of 50% was obtained. DMF (789.8 parts) was added to the copolymer solution, whereby a coating polymer compound solution having a resin solids concentration of 30 wt % was obtained.

Production Example 2: Production of Coated Positive Electrode Active Material Particles (CA-1)

Positive electrode active material powder ($LiNi_{0.8}Co_{0.1}Al_{0.05}O_2$ powder; volume average particle size: 4 μm) (100 parts) was fed into a universal mixer "High Speed Mixer FS25" (Earthtechnica Co, Ltd.). While the powder was stirred at 720 rpm at room temperature, the coating polymer solution (20.3 parts) obtained in Production Example 1 was dropped over 2 minutes, followed by stirring for additional 5 minutes.

Subsequently, while stirring, acetylene black (Denka Company Limited, Denka Black (trademark), 6.1 parts) as a conductive material was added in portions over 6 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 μm, whereby coated positive electrode active material particles (CA-1) were obtained.

Production Example 3: Production of Coated Positive Electrode Active Material Particles (CA-2)

As in Production Example 2, positive electrode active material powder ($LiNi_{0.5}Mn_{0.3}CO_{0.2}O_2$ powder; volume average particle size: 5 μm) (100 parts) was fed into a universal mixer. While the powder was stirred at 720 rpm at room temperature, the coating polymer solution (9.3 parts) obtained in Production Example 1 was dropped over 3 minutes, followed by stirring for additional 5 minutes.

Subsequently, while stirring, acetylene black (10 parts) as a conductive material was added in portions over 2 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 µm, whereby coated positive electrode active material particles (CA-2) were obtained.

Production Example 4: Production of Coated Positive Electrode Active Material Particles (CA-3)

As in Production Example 2, positive electrode active material powder (LiNi$_{0.8}$Co$_{0.15}$Al$_{0.05}$O$_2$ powder; volume average particle size: 4 µm) (100 parts) was fed into a universal mixer. While the powder was stirred at 720 rpm at room temperature, the coating polymer solution (86.7 parts) obtained in Production Example 1 was dropped over 25 minutes, followed by stirring for additional 5 minutes.

Subsequently, while stirring, acetylene black (7.2 parts) as a conductive material was added in portions over 2 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 µm, whereby coated positive electrode active material particles (CA-3) were obtained.

Production Example 5: Production of Coated Negative Electrode Active Material Particles (AA-1)

As in Production Example 2, negative electrode active material powder (non-graphitizable activated carbon powder; volume average particle size: 7 µm) (100 parts) was fed into a universal mixer. While the powder was stirred at 720 rpm at room temperature, the coating polymer solution (11.3 parts) obtained in Production Example 1 was dropped over 3 minutes, followed by stirring for additional 5 minutes.

Subsequently, while stirring, acetylene black (1.0 part) as a conductive material was added in portions over 2 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 µm, whereby coated negative electrode active material particles (AA-1) were obtained.

Production Example 6: Production of Coated Negative Electrode Active Material Particles (AA-2)

As in Production Example 2, negative electrode active material powder (artificial graphite powder; volume average particle size: 12 µm) (100 parts) was fed into a universal mixer. While the powder was stirred at 720 rpm at room temperature, the coating polymer solution (1.3 parts) obtained in Production Example 1 was dropped over 30 seconds, followed by stirring for additional 5 minutes.

Subsequently, while stirring, acetylene black (0.6 parts) as a conductive material was added in portions over 2 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 µm, whereby coated negative electrode active material particles (AA-2) were obtained.

Production Example 7: Production of Coated Negative Electrode Active Material Particles (AA-3)

As in Production Example 2, negative electrode active material powder (non-graphitizable activated carbon powder; volume average particle size: 7 µm) (100 parts) was fed into a universal mixer. While the powder was stirred at 720 rpm at room temperature, the coating polymer solution (104 parts) obtained in Production Example 1 was dropped over 30 minutes, followed by stirring for additional 5 minutes.

Subsequently, while stirring, acetylene black (3.3 parts) as a conductive material was added in portions over 2 minutes. Stirring was continued for 30 minutes. Subsequently, while stirring, the pressure was reduced to 0.01 MPa. Then, while stirring at the same reduced pressure, the temperature was raised to 140° C. The temperature was maintained for 8 hours while stirring at the same reduced pressure, whereby the volatile matter was distilled off. The thus-obtained powder was classified by a sieve having an opening of 212 µm, whereby coated negative electrode active material particles (AA-3) were obtained.

Production Example 8: Production of Electrolyte Solution

LiPF$_6$ was dissolved at a ratio of 1 mol/L in a solvent mixture of ethylene carbonate (EC) and diethyl carbonate (DEC) (volume ratio of 1:1). Thus, an electrolyte solution for a lithium-ion battery was produced.

(Example 1) Production of Positive Electrode Active Material Molded Body (CE-1)

The coated positive electrode active material particles (CA-1) (5 g) obtained in Production Example 2 and carbon fibers (Donacarbo Milled S-242 available from Osaka Gas Chemicals Co., Ltd.) (0.1 g) as a conductive additive were mixed in a planetary agitation type mixer/kneader (Thinky-mixer (Thinky Corporation)) at 1500 rpm for 3 minutes.

Further, the electrolyte solution (0.02 g) produced in Production Example 8 was added, and mixed together at 1500 rpm for 1 minute. This step was repeated twice. Thus, the electrolyte solution was added in a total amount of 0.04 g.

Then, 0.217 g of the mixture was weighed out. The mixture was placed in a cylindrical bottomed container having an inside diameter of 15 mm, and compressed by a pressing device, whereby a positive electrode active material molded body (CE-1) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 2) Production of Positive Electrode Active Material Molded Body (CE-2)

The coated positive electrode active material particles (CA-1) (5 g) obtained in Production Example 2 and carbon fibers (Donacarbo Milled S-242 available from Osaka Gas Chemicals Co., Ltd.) (0.05 g) as a conductive additive were mixed in a planetary agitation type mixer/kneader at 1500 rpm for 3 minutes.

Further, the electrolyte solution (0.1 g) produced in Production Example 8 was added, and mixed together at 1500 rpm for 1 minute. This step was repeated thrice. Thus, the electrolyte solution was added in a total amount of 0.3 g.

Then, 0.227 g of the mixture was weighed out. The mixture was placed in a cylindrical bottomed container having an inside diameter of 15 mm, and compressed by a pressing device, whereby a positive electrode active material molded body (CE-2) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 3) Production of Positive Electrode Active Material Molded Body (CE-3)

The coated positive electrode active material particles (CA-1) (5 g) obtained in Production Example 2 and carbon fibers (Donacarbo Milled S-243 available from Osaka Gas Chemicals Co., Ltd.) (0.1 g) as a conductive additive were mixed in a planetary agitation type mixer/kneader at 2000 rpm for 3 minutes.

Further, the electrolyte solution (0.2 g) produced in Production Example 8 was added, and mixed together at 1500 rpm for 1 minute. This step was repeated thrice. Thus, the electrolyte solution was added in a total amount of 0.6 g.

Then, 0.241 g of the mixture was weighed out. The mixture was placed in a cylindrical bottomed container having an inside diameter of 15 mm, and compressed by a pressing device, whereby a positive electrode active material molded body (CE-3) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 4) Production of Positive Electrode Active Material Molded Body (CE-4)

The coated positive electrode active material particles (CA-2) (5 g) obtained in Production Example 3 and carbon fibers (milled fiber CFMP-300X available from Nippon Polymer Sangyo Co., Ltd.) (0.25 g) as a conductive additive were mixed in a planetary agitation type mixer/kneader at 1500 rpm for 3 minutes.

Further, the electrolyte solution (0.5 g) produced in Production Example 8 was added, and mixed together at 1500 rpm for 1 minute. This step was repeated thrice. Thus, the electrolyte solution was added in a total amount of 1.5 g.

Then, 0.298 g of the mixture was weighed out. The mixture was placed in a cylindrical bottomed container having an inside diameter of 15 mm, and compressed by a pressing device, whereby a positive electrode active material molded body (CE-4) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 5) Production of Positive Electrode Active Material Molded Body (CE-5)

To the coated positive electrode active material particles (CA-2) (5 g) obtained in Production Example 3 was added the electrolyte solution (0.6 g) produced in Production Example 8, followed by mixing at 1500 rpm for 1 minute. This step was repeated thrice. Thus, the electrolyte solution was added in a total amount of 1.8 g.

Then, 0.305 g of the mixture was weighed out. The mixture was placed in a cylindrical bottomed container having an inside diameter of 15 mm, and compressed by a pressing device, whereby a positive electrode active material molded body (CE-5) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 6) Production of Positive Electrode Active Material Molded Body (CE-6)

The coated positive electrode active material particles (CA-1) (5 g) obtained in Production Example 2, carbon fibers (Donacarbo Milled S-243 available from Osaka Gas Chemicals Co., Ltd.) (0.15 g) and carbon fiber (milled fiber CFMP-300X available from Nippon Polymer Sangyo Co., Ltd.) (0.6 g) as conductive additives were mixed in a planetary agitation type mixer/kneader at 1500 rpm for 3 minutes.

Further, the electrolyte solution (0.3 g) produced in Production Example 8 was added, and mixed together at 1500 rpm for 1 minute. This step was repeated thrice. Thus, the electrolyte solution was added in a total amount of 0.9 g.

Then, 0.244 g of the mixture was weighed out. The mixture was placed in a cylindrical bottomed container having an inside diameter of 15 mm, and compressed by a pressing device, whereby a positive electrode active material molded body (CE-6) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 7) Production of Positive Electrode Active Material Molded Body (CE-7)

The coated positive electrode active material particles (CA-3) (5 g) obtained in Production Example 4 and carbon fibers (milled fiber CFMP-300X available from Nippon Polymer Sangyo Co., Ltd.) (0.4 g) as a conductive additive were mixed in a planetary agitation type mixer/kneader at 1500 rpm for 3 minutes.

Further, the electrolyte solution (0.4 g) produced in Production Example 8 was added, and mixed together at 1500 rpm for 1 minute. This step was repeated thrice. Thus, the electrolyte solution was added in a total amount of 1.2 g.

Then, 0.271 g of the mixture was weighed out. The mixture was placed in a cylindrical bottomed container having an inside diameter of 15 mm, and compressed by a pressing device, whereby a positive electrode active material molded body (CE-7) molded into a cylindrical shape was obtained.

The compression conditions were as follows: compression pressure: 150 MPa; compression time: 5 seconds;

temperature of the pressing device (pressing jig): 20° C. (same as the room temperature during compression).

(Comparative Example 1) Production of Positive Electrode Active Material Molded Body (CE-8)

The coated positive electrode active material particles (CA-1) (5 g) obtained in Production Example 2 and carbon fibers (Donacarbo Milled S-243 available from Osaka Gas Chemicals Co., Ltd.) (0.1 g) as a conductive additive were mixed in a planetary agitation type mixer/kneader at 1500 rpm for 3 minutes.

Further, 0.216 g of the mixture was weighed out. The mixture was placed in a cylindrical bottomed container having an inside diameter of 15 mm, and compressed by a pressing device, whereby a positive electrode active material molded body (CE-8) molded into a cylindrical shape was obtained.

The compression conditions were as follows: compression pressure: 150 MPa; compression time: 5 seconds; temperature of the pressing device (pressing jig): 20° C. (same as the room temperature during compression).

(Comparative Example 2) Production of Positive Electrode Active Material Molded Body (CE-9)

The coated positive electrode active material particles (CA-2) (5 g) obtained in Production Example 3 and carbon fibers (Donacarbo Milled S-243 available from Osaka Gas Chemicals Co., Ltd.) (0.1 g) as a conductive additive were mixed in a planetary agitation type mixer/kneader at 1500 rpm for 3 minutes.

Further, the electrolyte solution (0.9 g) produced in Production Example 8 was added, and mixed together at 1500 rpm for 1 minute. This step was repeated six times. Thus, the electrolyte solution was added in a total amount of 5.4 g.

Then, 0.458 g of the mixture was weighed out. The mixture was placed in a cylindrical bottomed container having an inside diameter of 15 mm, and compressed by a pressing device, whereby a positive electrode active material molded body (CE-9) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 8) Production of Negative Electrode Active Material Molded Body (AE-1)

The coated negative electrode active material particles (AA-1) (5 g) obtained in Production Example 5 and carbon fibers (milled fiber CFMP-300X available from Nippon Polymer Sangyo Co., Ltd.) (0.05 g) as a conductive additive were mixed in a planetary agitation type mixer/kneader at 1500 rpm for 3 minutes.

Further, the electrolyte solution (0.02 g) produced in Production Example 8 was added, and mixed together at 1500 rpm for 1 minute. This step was repeated thrice. Thus, the electrolyte solution was added in a total amount of 0.06 g.

Then, 0.107 g of the mixture was weighed out. The mixture was placed in a cylindrical bottomed container having an inside diameter of 16 mm, and compressed by a pressing device, whereby a negative electrode active material molded body (AE-1) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 9) Production of Negative Electrode Active Material Molded Body (AE-2)

The coated negative electrode active material particles (AA-1) (5 g) obtained in Production Example 5 and carbon fibers (Donacarbo Milled S-243 available from Osaka Gas Chemicals Co., Ltd.) (0.05 g) as a conductive additive were mixed in a planetary agitation type mixer/kneader at 1500 rpm for 3 minutes.

Further, the electrolyte solution (0.13 g) produced in Production Example 8 was added, and mixed together at 1500 rpm for 1 minute. This step was repeated thrice. Thus, the electrolyte solution was added in a total amount of 0.39 g.

Then, 0.115 g of the mixture was weighed out. The mixture was placed in a cylindrical bottomed container having an inside diameter of 16 mm, and compressed by a pressing device, whereby a negative electrode active material molded body (AE-2) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 10) Production of Negative Electrode Active Material Molded Body (AE-3)

To the coated negative electrode active material particles (AA-1) (5 g) obtained in Production Example 5 was added the electrolyte solution (0.3 g) produced in Production Example 8, followed by mixing at 1500 rpm for 1 minute. This step was repeated thrice. Thus, the electrolyte solution was added in a total amount of 0.9 g.

Then, 0.121 g of the mixture was weighed out. The mixture was placed in a cylindrical bottomed container having an inside diameter of 16 mm, and compressed by a pressing device, whereby a negative electrode active material molded body (AE-3) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 11) Production of Negative Electrode Active Material Molded Body (AE-4)

To the coated negative electrode active material particles (AA-2) (5 g) obtained in Production Example 6 was added the electrolyte solution (0.6 g) produced in Production Example 8, followed by mixing at 1500 rpm for 1 minute. This step was repeated thrice. Thus, the electrolyte solution was added in a total amount of 1.8 g.

Then, 0.169 g of the mixture was weighed out. The mixture was placed in a cylindrical bottomed container having an inside diameter of 16 mm, and compressed by a pressing device, whereby a negative electrode active material molded body (AE-4) molded into a cylindrical shape was obtained.

The compression conditions were as follows: compression pressure: 150 MPa; compression time: 5 seconds;

temperature of the pressing device (pressing jig): 20° C. (same as the room temperature during compression).

(Example 12) Production of Negative Electrode Active Material Molded Body (AE-5)

The coated negative electrode active material particles (AA-2) (5 g) obtained in Production Example 6 and carbon fibers (milled fiber CFMP-300X available from Nippon Polymer Sangyo Co., Ltd.) (0.05 g) as a conductive additive were mixed in a planetary agitation type mixer/kneader at 1500 rpm for 3 minutes.

Further, the electrolyte solution (0.94 g) produced in Production Example 8 was added, and mixed together at 1500 rpm for 1 minute. This step was repeated thrice. Thus, the electrolyte solution was added in a total amount of 2.82 g.

Then, 0.192 g of the mixture was weighed out. The mixture was placed in a cylindrical bottomed container having an inside diameter of 16 mm, and compressed by a pressing device, whereby a negative electrode active material molded body (AE-5) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 13) Production of Negative Electrode Active Material Molded Body (AE-6)

The coated negative electrode active material particles (AA-1) (5 g) obtained in Production Example 5, carbon fibers (Donacarbo Milled S-243 available from Osaka Gas Chemicals Co., Ltd.) (0.3 g) as a conductive additive, and carbon fiber (milled fiber CFMP-300X available from Nippon Polymer Sangyo Co., Ltd.) (0.95 g) were mixed in a planetary agitation type mixer/kneader at 1500 rpm for 3 minutes.

Further, the electrolyte solution (0.4 g) produced in Production Example 8 was added, and mixed together at 1500 rpm for 1 minute. This step was repeated thrice. Thus, the electrolyte solution was added in a total amount of 1.2 g.

Then, 0.155 g of the mixture was weighed out. The mixture was placed in a cylindrical bottomed container having an inside diameter of 16 mm, and compressed by a pressing device, whereby a negative electrode active material molded body (AE-6) molded into a cylindrical shape was obtained.

The compression conditions were as follows: compression pressure: 150 MPa; compression time: 5 seconds; temperature of the pressing device (pressing jig): 20° C. (same as the room temperature during compression).

(Example 14) Production of Negative Electrode Active Material Molded Body (AE-7)

The coated negative electrode active material particles (AA-3) (5 g) obtained in Production Example 7 and carbon fibers (Donacarbo Milled S-242 available from Osaka Gas Chemicals Co., Ltd.) (0.05 g) as a conductive additive were mixed in a planetary agitation type mixer/kneader at 1500 rpm for 3 minutes.

Further, the electrolyte solution (0.4 g) produced in Production Example 8 was added, and mixed together at 1500 rpm for 1 minute. This step was repeated thrice. Thus, the electrolyte solution was added in a total amount of 1.2 g.

Then, 0.169 g of the mixture was weighed out. The mixture was placed in a cylindrical bottomed container having an inside diameter of 16 mm, and compressed by a pressing device, whereby a negative electrode active material molded body (AE-7) molded into a cylindrical shape was obtained.

The compression conditions were as follows: compression pressure: 150 MPa; compression time: 5 seconds; temperature of the pressing device (pressing jig): 20° C. (same as the room temperature during compression).

(Comparative Example 3) Production of Negative Electrode Active Material Molded Body (AE-8)

The coated negative electrode active material particles (AA-1) (5 g) obtained in Production Example 5 and carbon fibers (Donacarbo Milled S-242 available from Osaka Gas Chemicals Co., Ltd.) (0.05 g) as a conductive additive were mixed in a planetary agitation type mixer/kneader at 1500 rpm for 3 minutes.

Further, 0.105 g of the mixture was weighed out. The mixture was placed in a cylindrical bottomed container having an inside diameter of 16 mm, and compressed by a pressing device, whereby a negative electrode active material molded body (AE-8) molded into a cylindrical shape was obtained.

The compression conditions were as follows: compression pressure: 150 MPa; compression time: 5 seconds; temperature of the pressing device (pressing jig): 20° C. (same as the room temperature during compression).

(Comparative Example 4) Production of Negative Electrode Active Material Molded Body (AE-9)

To the coated negative electrode active material particles (AA-2) (5 g) obtained in Production Example 6 was added the electrolyte solution (2.9 g) produced in Production Example 8, followed by mixing at 1500 rpm for 1 minute. This step was repeated thrice. Thus, the electrolyte solution was added in a total amount of 8.7 g.

Then, 0.331 g of the mixture was weighed out. The mixture was placed in a cylindrical bottomed container having an inside diameter of 16 mm, and compressed by a pressing device, whereby a negative electrode active material molded body (AE-9) molded into a cylindrical shape was obtained.

The compression conditions were as follows: compression pressure: 150 MPa; compression time: 5 seconds; temperature of the pressing device (pressing jig): 20° C. (same as the room temperature during compression).

Production Example 9: Production of Battery Housing Material

Copper foil (3 cm×3 cm; thickness: 17 μm) with a nickel foil terminal (width: 5 mm; length: 3 cm) ultrasonically welded thereto and carbon-coated aluminum foil (3 cm×3 cm; thickness: 21 μm) with an aluminum foil terminal (width: 5 mm; length: 3 cm) ultrasonically welded thereto were stacked together such that these two terminals were led out in the same direction. The stuck was held between commercially available two thermally fusible aluminum laminate films (10 cm×8 cm), and one side from which the terminals were led out was thermally fused. Thus, a battery housing material was produced.

(Example 15) Production of Lithium-Ion Battery
(L-1)

The negative electrode active material molded body (AE-3) obtained in Example 10 was placed on the copper foil of the battery housing material, and an electrolyte solution (40 μL) was added thereto. Then, a separator (5 cm×5 cm; thickness: 23 μm, Celgard 2500 made of polypropylene) was placed on the negative electrode active material molded body (AE-3), followed by further addition of the electrolyte solution (20 μL). The positive electrode active material molded body (CE-1) obtained in Example 1 was stacked to face the negative electrode active material molded body (AE-3) with the separator therebetween, followed by addition of the electrolyte solution (50 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-1) was obtained.

(Example 16) Production of Lithium-Ion Battery
(L-2)

The negative electrode active material molded body (AE-3) obtained in Example 10 was placed on the copper foil of the battery housing material, and an electrolyte solution (40 μL) was added thereto. Then, a separator was placed on the negative electrode active material molded body (AE-3), followed by further addition of the electrolyte solution (20 μL). The positive electrode active material molded body (CE-2) obtained in Example 2 was stacked to face the negative electrode active material molded body (AE-3) with the separator therebetween, followed by addition of the electrolyte solution (40 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-2) was obtained.

(Example 17) Production of Lithium-Ion Battery
(L-3)

The negative electrode active material molded body (AE-3) obtained in Example 10 was placed on the copper foil of the battery housing material, and an electrolyte solution (40 μL) was added thereto. Then, a separator was placed on the negative electrode active material molded body (AE-3), followed by further addition of the electrolyte solution (20 μL). The positive electrode active material molded body (CE-3) obtained in Example 3 was stacked to face the negative electrode active material molded body (AE-3) with the separator therebetween, followed by addition of the electrolyte solution (40 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-3) was obtained.

(Example 18) Production of Lithium-Ion Battery
(L-4)

The negative electrode active material molded body (AE-3) obtained in Example 10 was placed on the copper foil of the battery housing material, and an electrolyte solution (40 μL) was added thereto. Then, a separator was placed on the negative electrode active material molded body (AE-3), followed by further addition of the electrolyte solution (20 μL). The positive electrode active material molded body (CE-4) obtained in Example 4 was stacked to face the negative electrode active material molded body (AE-3) with the separator therebetween, followed by addition of the electrolyte solution (40 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-4) was obtained.

(Example 19) Production of Lithium-Ion Battery
(L-5)

The negative electrode active material molded body (AE-3) obtained in Example 10 was placed on the copper foil of the battery housing material, and an electrolyte solution (40 μL) was added thereto. Then, a separator was placed on the negative electrode active material molded body (AE-3), followed by further addition of the electrolyte solution (20 μL). The positive electrode active material molded body (CE-5) obtained in Example 5 was stacked to face the negative electrode active material molded body (AE-3) with the separator therebetween, followed by addition of the electrolyte solution (30 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-5) was obtained.

(Example 20) Production of Lithium-Ion Battery
(L-6) the Negative Electrode Active Material
Molded Body (AE-3) obtained in Example 10 was placed on the copper foil of the battery housing material, and an electrolyte solution (40 μL) was added thereto. Then, a separator was placed on the negative electrode active material molded body (AE-3), followed by further addition of the electrolyte solution (20 μL). The positive electrode active material molded body (CE-6) obtained in Example 6 was stacked to face the negative electrode active material molded body (AE-3) with the separator therebetween, followed by addition of the electrolyte solution (40 μL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-6) was obtained.

(Example 21) Production of Lithium-Ion Battery (L-7)

The negative electrode active material molded body (AE-3) obtained in Example 10 was placed on the copper foil of the battery housing material, and an electrolyte solution (40 µL) was added thereto. Then, a separator was placed on the negative electrode active material molded body (AE-3), followed by further addition of the electrolyte solution (20 µL). The positive electrode active material molded body (CE-7) obtained in Example 7 was stacked to face the negative electrode active material molded body (AE-3) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-7) was obtained.

(Comparative Example 5) Production of Lithium-Ion Battery (L-8)

The negative electrode active material molded body (AE-3) obtained in Example 10 was placed on the copper foil of the battery housing material, and an electrolyte solution (40 µL) was added thereto. Then, a separator was placed on the negative electrode active material molded body (AE-3), followed by further addition of the electrolyte solution (20 µL). The positive electrode active material molded body (CE-8) obtained in Comparative Example 1 was stacked to face the negative electrode active material molded body (AE-3) with the separator therebetween, followed by addition of the electrolyte solution (50 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-8) was obtained.

(Comparative Example 6) Production of Lithium-Ion Battery (L-9)

The negative electrode active material molded body (AE-3) obtained in Example 10 was placed on the copper foil of the battery housing material, and an electrolyte solution (40 µL) was added thereto. Then, a separator was placed on the negative electrode active material molded body (AE-3), followed by further addition of the electrolyte solution (20 µL). The positive electrode active material molded body (CE-9) obtained in Comparative Example 2 was stacked to face the negative electrode active material molded body (AE-3) with the separator therebetween, followed by addition of the electrolyte solution (10 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-9) was obtained.

(Example 22) Production of Lithium-Ion Battery (L-10)

The negative electrode active material molded body (AE-1) obtained in Example 8 was placed on the copper foil of the battery housing material, and an electrolyte solution (50 µL) was added thereto. Then, a separator was placed on the negative electrode active material molded body (AE-1), followed by further addition of the electrolyte solution (20 µL). The positive electrode active material molded body (CE-3) obtained in Example 3 was stacked to face the negative electrode active material molded body (AE-1) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-10) was obtained.

(Example 23) Production of Lithium-Ion Battery (L-11)

The negative electrode active material molded body (AE-2) obtained in Example 9 was placed on the copper foil of the battery housing material, and an electrolyte solution (40 µL) was added thereto. Then, a separator was placed on the negative electrode active material molded body (AE-2), followed by further addition of the electrolyte solution (20 µL). The positive electrode active material molded body (CE-3) obtained in Example 3 was stacked to face the negative electrode active material molded body (AE-2) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-11) was obtained.

(Example 24) Production of Lithium-Ion Battery (L-12)

The negative electrode active material molded body (AE-4) obtained in Example 11 was placed on the copper foil of the battery housing material, and an electrolyte solution (40 µL) was added thereto. Then, a separator was placed on the negative electrode active material molded body (AE-4), followed by further addition of the electrolyte solution (20 µL). The positive electrode active material molded body (CE-3) obtained in Example 3 was stacked to face the negative electrode active material molded body (AE-4) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-12) was obtained.

(Example 25) Production of Lithium-Ion Battery (L-13)

The negative electrode active material molded body (AE-5) obtained in Example 12 was placed on the copper foil of the battery housing material, and an electrolyte solution (30 µL) was added thereto. Then, a separator was placed on the negative electrode active material molded body (AE-5), followed by further addition of the electrolyte solution (20 µL). The positive electrode active material molded body (CE-3) obtained in Example 3 was stacked to face the negative electrode active material molded body (AE-5) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-13) was obtained.

(Example 26) Production of Lithium-Ion Battery (L-14)

The negative electrode active material molded body (AE-6) obtained in Example 13 was placed on the copper foil of the battery housing material, and an electrolyte solution (40 µL) was added thereto. Then, a separator was placed on the negative electrode active material molded body (AE-6), followed by further addition of the electrolyte solution (20 µL). The positive electrode active material molded body (CE-3) obtained in Example 3 was stacked to face the negative electrode active material molded body (AE-6) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-14) was obtained.

(Example 27) Production of Lithium-Ion Battery (L-15)

The negative electrode active material molded body (AE-7) obtained in Example 14 was placed on the copper foil of the battery housing material, and an electrolyte solution (40 µL) was added thereto. Then, a separator was placed on the negative electrode active material molded body (AE-7), followed by further addition of the electrolyte solution (20 µL). The positive electrode active material molded body (CE-3) obtained in Example 3 was stacked to face the negative electrode active material molded body (AE-7) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-15) was obtained.

(Comparative Example 7) Production of Lithium-Ion Battery (L-16)

The negative electrode active material molded body (AE-8) obtained in Comparative Example 3 was placed on the copper foil of the battery housing material, and an electrolyte solution (50 µl) was added thereto. Then, a separator was placed on the negative electrode active material molded body (AE-8), followed by further addition of the electrolyte solution (20 µL). The positive electrode active material molded body (CE-3) obtained in Example 3 was stacked to face the negative electrode active material molded body (AE-8) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-16) was obtained.

(Comparative Example 8) Production of Lithium-Ion Battery (L-17)

The negative electrode active material molded body (AE-9) obtained in Comparative Example 4 was placed on the copper foil of the battery housing material, and an electrolyte solution (10 µL) was added thereto. Then, a separator was placed on the negative electrode active material molded body (AE-9), followed by further addition of the electrolyte solution (20 µL). The positive electrode active material molded body (CE-3) obtained in Example 3 was stacked to face the negative electrode active material molded body (AE-9) with the separator therebetween, followed by addition of the electrolyte solution (40 µL). Further, the positive electrode active material molded body was covered with the battery housing material such that the carbon-coated aluminum foil was overlaid on the positive electrode active material molded body. Three non-thermally-fused sides of the battery housing material were heat-sealed while the inside of the battery housing material was evacuated to seal the battery housing material. Thus, a lithium-ion battery (L-17) was obtained.

<Evaluation of Moldability of Electrode Active Material Molded Body>

To evaluate the moldability, the appearance of each of the electrode active material molded bodies of Examples 1 to 14 and Comparative Examples 1 to 4 was visually evaluated based on the following criteria.

Excellent: No cracking, falling off, or flowing off occurred, and the shape was retained.
Good: Cracking, falling off, and/or flowing off occurred slightly, but the shape was retained to some degree.
Poor: Cracking, falling off, and/or flowing off occurred, and the shape was not retained.

<Evaluation of Shape Retainability of Electrode Active Material Molded Body>

In Examples 15 to 27 and Comparative Examples 5 to 8, the shape retainability after the electrolyte solution was injected into each of the electrode active material molded bodies produced in Examples 1 to 14 and Comparative Example 1 to 4 were visually evaluated based on the following criteria. It should be noted that the shape retainability of the positive electrode active material molded body (CE-3) produced in Example 3 was evaluated in Example 17, and the shape retainability of the negative electrode active material molded body (AE-3) produced in Example 10 was evaluated in Example 15.

Excellent: No cracking, falling off, or flowing off occurred, and the shape was retained.
Good: Cracking, falling off, and/or flowing off occurred slightly, but the shape was retained.
Fair: Cracking, falling off, and/or flowing off occurred, and the shape was somewhat destroyed but there are no practical problems.
Poor: Cracking, falling off, and/or flowing off occurred, and the shape was not retained.
–: Unevaluable because the shape was not retained before the electrolyte solution was injected.

In a constant current constant voltage charging mode (also referred to as "CCCV mode), the lithium-ion battery was charged at a current of 0.1 C to a voltage of 4.2 V, and then charged until the current value was 0.01 C while the voltage was constant at 4.2 V. After a 10-minute pause, the lithium-ion battery was discharged at a current of 0.1 C to a voltage of 2.5 V.

Here, the charge capacity was regarded as "initial charge capacity (mAh)" and the discharge capacity was regarded as "initial discharge capacity (mAh)".

<Evaluation of Initial Coulombic Efficiency of Lithium-Ion Battery>

The initial coulombic efficiency was calculated from the following formula using the initial charge capacity and the initial discharge capacity determined in the above measurement.

Coulombic efficiency (%)=(Initial discharge capacity)÷(initial charge capacity)×100

<Evaluation of Capacity Retention of Lithium-Ion Battery in the 20th Cycle>

The capacity retention of the lithium-ion battery in the 20th cycle was evaluated by the following method using a charge/discharge measurement device at 25° C.

In the constant current constant voltage charging mode, the lithium-ion battery was charged at a current of 0.1 C to a voltage of 4.2 V, and then charged until the current value was 0.01 C while the voltage was constant at 4.2 V. After a 10-minute pause, the lithium-ion battery was discharged at a current of 0.1 C to a voltage of 2.5 V, followed by a 10-minute pause.

This procedure was regarded as one cycle, and the measurement was performed until a total of 20 cycles were completed. The discharge capacity in the 20th cycle was regarded as "discharge capacity in the 20th cycle (mAh)", and the capacity retention in the 20th cycle was calculated

TABLE 1

| | Electrode active material molded body | Electrode active material for lithium-ion battery | | | Conductive material Weight [g] | Electrolyte solution | | Evaluation | |
|---|---|---|---|---|---|---|---|---|---|
| | | Active material type | Mass [g] | Percentage [wt %] | | Weight [g] | Content [wt %] | Moldability | Shape retainability |
| Example 1 | CE-1 | CA-1 | 5 | 88.2 | 0.05 | 0.04 | 0.8 | Good | Good |
| Example 2 | CE-2 | CA-1 | 5 | 88.2 | 0.05 | 0.3 | 5.6 | Excellent | Good |
| Example 3 | CE-3 | CA-1 | 5 | 87.4 | 0.1 | 0.6 | 10.5 | Excellent | Excellent |
| Example 4 | CE-4 | CA-2 | 5 | 84.5 | 0.25 | 1.5 | 22.2 | Excellent | Excellent |
| Example 5 | CE-5 | CA-2 | 5 | 88.7 | 0 | 1.8 | 26.5 | Excellent | Good |
| Example 6 | CE-6 | CA-1 | 5 | 77.5 | 0.75 | 0.9 | 13.5 | Good | Fair |
| Example 7 | CE-7 | CA-3 | 5 | 69.5 | 0.4 | 1.2 | 18.2 | Excellent | Excellent |
| Example 8 | AE-1 | AA-1 | 5 | 94.8 | 0.05 | 0.06 | 1.2 | Good | Good |
| Example 9 | AE-2 | AA-1 | 5 | 94.8 | 0.05 | 0.39 | 7.2 | Excellent | Good |
| Example 10 | AE-3 | AA-1 | 5 | 95.8 | 0 | 0.9 | 15.3 | Excellent | Excellent |
| Example 11 | AE-4 | AA-2 | 5 | 99.0 | 0 | 1.8 | 26.5 | Excellent | Excellent |
| Example 12 | AE-5 | AA-2 | 5 | 98.0 | 0.05 | 2.82 | 35.8 | Excellent | Good |
| Example 13 | AE-6 | AA-1 | 5 | 76.6 | 1.25 | 1.2 | 16.1 | Good | Fair |
| Example 14 | AE-7 | AA-3 | 5 | 73.6 | 0.05 | 1.2 | 19.2 | Excellent | Excellent |
| Comparative Example 1 | CE-8 | CA-1 | 5 | 87.4 | 0.1 | 0 | 0.0 | Poor | Unevaluable |
| Comparative Example 2 | CE-9 | CA-2 | 5 | 86.9 | 0.1 | 5.4 | 51.4 | Poor | Unevaluable |
| Comparative Example 3 | AE-8 | AA-1 | 5 | 94.8 | 0.05 | 0 | 0.0 | Poor | Unevaluable |
| Comparative Example 4 | AE-9 | AA-2 | 5 | 99.0 | 0 | 8.7 | 63.5 | Poor | Unevaluable |

<Evaluation of Initial Discharge of Lithium-Ion Battery>

The initial discharge performance of the lithium-ion battery was evaluated using a charge/discharge measurement device "HJ-SD8" (Hokuto Denko Corporation) at 25° C.

from the following formula using the initial discharge capacity and the discharge capacity in the 20th cycle.

Capacity retention in the 20th cycle (%)=(Discharge capacity in the 20th cycle)÷(initial discharge capacity)×100

TABLE 2

| | Lithium-ion battery | Positive electrode active material molded body | Negative electrode active material molded body | Evaluation | | |
|---|---|---|---|---|---|---|
| | | | | Initial discharge capacity (mAh) | Initial coulombic efficiency (%) | Capacity retention (%) in the 20th cycle |
| Example 15 | L-1 | CE-1 | AE-3 | 32.2 | 83 | 98 |
| Example 16 | L-2 | CE-2 | | 32.1 | 82 | 99 |
| Example 17 | L-3 | CE-3 | | 32.4 | 83 | 99 |
| Example 18 | L-4 | CE-4 | | 33.5 | 84 | 98 |
| Example 19 | L-5 | CE-5 | | 33.4 | 81 | 99 |
| Example 20 | L-6 | CE-6 | | 32.2 | 82 | 98 |
| Example 21 | L-7 | CE-7 | | 31.5 | 79 | 96 |
| Comparative Example 5 | L-8 | CE-8 | | Unmeasurable due to collapse of positive electrode active material molded body | | |
| Comparative Example 6 | L-9 | CE-9 | | Unmeasurable due to collapse of positive electrode active material molded body | | |
| Example 22 | L-10 | CE-3 | AE-1 | 32.3 | 82 | 99 |
| Example 23 | L-11 | | AE-2 | 32.2 | 82 | 99 |
| Example 24 | L-12 | | AE-4 | 33.6 | 91 | 97 |
| Example 25 | L-13 | | AE-5 | 33.8 | 90 | 98 |
| Example 26 | L-14 | | AE-6 | 32.7 | 80 | 98 |
| Example 27 | L-15 | | AE-7 | 31.9 | 79 | 96 |
| Comparative Example 7 | L-16 | | AE-8 | Unmeasurable due to collapse of negative electrode active material molded body | | |
| Comparative Example 8 | L-17 | | AE-9 | Unmeasurable due to collapse of negative electrode active material molded body | | |

Each of the electrode active material molded bodies produced in Examples 1 to 14 was capable of retaining its shape during the production of the lithium-ion batteries in Examples 15 to 27, and had good handleability. Thus, the lithium-ion batteries were produced with a simple process.

INDUSTRIAL APPLICABILITY

The lithium-ion batteries obtained by the method of producing an electrode active material molded body for a lithium-ion battery of the present invention are useful particularly for mobile phones, personal computers, hybrid vehicles, and electric vehicles.

REFERENCE SIGNS LIST 1, 2, 3, 4: lithium-ion battery
10, 11, 15: electrode active material molded body
10a, 11a, 15a: positive electrode active material molded body
10b, 11b, 15b: negative electrode active material molded body
12a, 13a, 14a: positive electrode structure
12b, 13b, 14b: negative electrode structure
20, 20a, 20b, 21: separator
20c, 20d: end of separator
30: electrode active material molded body unit
30a, 35a: positive electrode active material molded body unit
30b, 35b: negative electrode active material molded body unit
40a, 41a, 42a, 43a: positive electrode current collector
40b, 41a, 42b, 43b: negative electrode current collector
42c: bipolar current collector
44: positive electrode terminal
45: negative electrode terminal
50a, 51a: positive electrode housing
50b, 51b: negative electrode housing
52, 53: battery housing
55: accommodating portion
55a, 56a: positive electrode accommodating portion
60, 60a, 60b: adhesive resin layer
61, 61a, 61b: adhesive resin layer
70 to 77: battery element
80: sealing material
100, 200: mold
101, 201: side mold
101a: inner wall of side mold 101
103, 203: bottom mold
103a: upper bottom of bottom mold 103
201a: inner wall of side mold 201
202: corner mold
203a: upper bottom of bottom mold 203
104, 204: compression jig
105, 106: jig
110: composition

The invention claimed is:

1. A method of producing an electrode active material molded body for a lithium-ion battery, comprising:
   a molding step of molding a composition containing an electrode active material for a lithium-ion battery and an electrolyte solution into an electrode active material molded body for a lithium-ion battery as an unbound product of the electrode active material for a lithium-ion battery,
   wherein the composition has an electrolyte solution content of 0.1 to 40 wt % based on the weight of the composition.

2. The method of producing an electrode active material molded body for a lithium-ion battery according to claim 1, wherein in the molding step, the composition is injected into a mold having a bottom and a side and is compression-molded.

3. The method of producing an electrode active material molded body for a lithium-ion battery according to claim 1, wherein the electrode active material for a lithium-ion battery is a coated active material in which at least a portion of its surface is coated with a coating agent containing a coating resin.

4. The method of producing an electrode active material molded body for a lithium-ion battery according to claim 1, wherein the weight percentage of the electrode active material for a lithium-ion battery contained in the composition is 80 to 100 wt % based on the total solids weight of the composition.

5. The method of producing an electrode active material molded body for a lithium-ion battery according to claim 1,
wherein in the molding step, a separator is placed in the mold having a bottom and a side so as to cover the entire bottom of the mold and at least a portion of the side of the mold, and the composition is injected into the mold with the separator placed therein and molded, so that the entire surface of the composition corresponding to the bottom of the mold and at least a portion of the surface of the composition corresponding to the side of the mold are continuously covered with the separator while the composition is molded.

6. A method of producing a lithium-ion battery, comprising:
an assembly step of placing the electrode active material molded body for a lithium-ion battery produced by the method of producing an electrode active material molded body for a lithium-ion battery according to claim 1 in an accommodating portion formed in at least a portion of a battery housing, and integrating the electrode active material molded body with the battery housing to prepare an electrode structure.

7. The method of producing a lithium-ion battery according to claim 6,
wherein in the molding step, a positive electrode active material molded body in which the electrode active material for a lithium-ion battery is a positive electrode active material and a negative electrode active material molded body in which the electrode active material for a lithium-ion battery is a negative electrode active material are obtained,
in the assembly step, the positive electrode active material molded body is integrated with a positive electrode housing to prepare a positive electrode structure, and the negative electrode active material molded body is integrated with a negative electrode housing to prepare a negative electrode structure, and
the method further comprises a sealing step of placing the positive electrode structure and the negative electrode structure such that the positive electrode active material molded body and the negative electrode active material molded body face each other with the separator therebetween, and sealing the positive electrode housing and the negative electrode housing.

8. A method of producing a lithium-ion battery, comprising:
an accommodating step of accommodating the electrode active material molded body for a lithium-ion battery produced by the method of producing an electrode active material molded body for a lithium-ion battery according to claim 1 into a battery housing,
wherein in the molding step, a positive electrode active material molded body in which the electrode active material for a lithium-ion battery is a positive electrode active material and a negative electrode active material molded body in which the electrode active material for a lithium-ion battery is a negative electrode active material are prepared, and
in the accommodating step, the positive electrode active material molded body and the negative electrode active material molded body are accommodated into the battery housing such that a plurality of battery elements each including the positive electrode active material molded body and the negative electrode active material molded body with a separator therebetween are connected in parallel or series.

\* \* \* \* \*